(12) United States Patent
Jeon et al.

(10) Patent No.: US 8,323,474 B2
(45) Date of Patent: Dec. 4, 2012

(54) ELECTRO-CHEMICAL WATER PROCESSING APPARATUS AND METHOD THEREOF

(75) Inventors: Chi-Jung Jeon, Gyeonggi-do (KR); Jong-Sung Kim, Seoul (KR); Kwang-Su Kim, Seoul (KR); Sang-Ki Hong, Seoul (KR)

(73) Assignee: Chi-Jung Jeon, Gyeonggi-do (KR)

( * ) Notice: Subject to any disclaimer, the term of this patent is extended or adjusted under 35 U.S.C. 154(b) by 629 days.

(21) Appl. No.: 12/515,670

(22) PCT Filed: Nov. 15, 2007

(86) PCT No.: PCT/KR2007/005735
§ 371 (c)(1),
(2), (4) Date: May 20, 2009

(87) PCT Pub. No.: WO2008/062970
PCT Pub. Date: May 29, 2008

(65) Prior Publication Data
US 2010/0051477 A1    Mar. 4, 2010

(30) Foreign Application Priority Data

Nov. 20, 2006    (KR) .................. 10-2006-0114701

(51) Int. Cl.
*C02F 1/461* (2006.01)
*C02F 1/463* (2006.01)
(52) U.S. Cl. ........ 205/743; 205/744; 205/751; 205/755; 205/757; 205/759; 204/228.1; 204/228.2; 204/228.6
(58) Field of Classification Search .................. 205/743, 205/744, 751, 755–759; 204/228.1–228.6
See application file for complete search history.

(56) References Cited

U.S. PATENT DOCUMENTS 3,616,355 A * 10/1971 Themy et al. ................. 205/701
(Continued)

FOREIGN PATENT DOCUMENTS

JP    2000-325960    11/2000
(Continued)

OTHER PUBLICATIONS

Korean office action received in corresponding Korean Application No. 2006-0114701 with English translation attached.

(Continued)

*Primary Examiner* — Arun S Phasge
(74) *Attorney, Agent, or Firm* — Grossman Tucker Perreault & Pfleger, PLLC

(57) ABSTRACT

Provided is an electro-chemical water treatment apparatus and method for removing total nitrogen ingredients of ammonia nitrogen, nitrous acid nitrogen, nitrate nitrogen etc., organic materials of BOD and COD induction ingredients, and cyanogen included in wastewater and dirty water. The apparatus includes: a wastewater collection reservoir that contains wastewater; a wastewater storage retention reservoir that controls a hydrogen ion concentration (pH), an electrical conductivity and an amount of flow of wastewater; an electrolyte tank which makes the electrical conductivity of the wastewater as an electrical conductivity at which an electrolysis can be achieved; a pH conditioner tank that supplies a pH conditioner for the wastewater; an electrolyzer including an anode plate and a cathode plate, and a number of electrodes which are arranged as an electrification body between the anode plate and the cathode plate; and a controller which grasps state of wastewater and which is connected to the anode plate and the cathode plate to thereby control the electrolysis.

10 Claims, 8 Drawing Sheets

U.S. PATENT DOCUMENTS

| | | | |
|---|---|---|---|
| 4,072,585 A | * | 2/1978 | Bianchi et al. ................. 205/535 |
| 5,744,028 A | * | 4/1998 | Goto et al. .................... 210/181 |
| 5,807,473 A | * | 9/1998 | Sadler et al. .................. 205/743 |
| 5,921,113 A | * | 7/1999 | Lee et al. ....................... 68/13 R |

FOREIGN PATENT DOCUMENTS

| | | |
|---|---|---|
| JP | 2003-080261 | 3/2003 |
| KR | 10-1996-0016696 | 12/1996 |
| KR | 10-0115224 | 12/1997 |
| KR | 1998-86123 | 12/1998 |
| KR | 10-0308531 | 8/2001 |
| KR | 10-0556291 | 3/2006 |

OTHER PUBLICATIONS

PCT International Search Report dated Feb. 20, 2008, received in PCT Application No. PCT/KR2007/005735.

PCT Written Opinion dated Feb. 20, 2008, received in PCT Application No. PCT/KR2007/005735.

* cited by examiner

ELECTRO-CHEMICAL WATER PROCESSING APPARATUS AND METHOD THEREOF

TECHNICAL FIELD

The present invention relates to an electro-chemical water processing (or treatment) apparatus and an electro-chemical water treatment method using the same, and more particularly to an electro-chemical water treatment apparatus using a titanium electrode, a ceramic electrode or an electrode array in order to remove total nitrogen (TN) ingredients of ammonia nitrogen, nitrous acid nitrogen, nitrate nitrogen etc., organic matters of BOD (Biological Oxygen Demand) and COD (Chemical Oxygen Demand) induction ingredients, and cyanogen included in wastewater and dirty water, and an electro-chemical water treatment method using the electro-chemical water treatment apparatus, including a pre-treatment process and a post-treatment process in order to efficiently electrolyze according to components and states of wastewater.

BACKGROUND ART

In general, wastewater includes nitrogen ingredients such as nitrate nitrogen ($NO_3^-$—N), nitrous acid nitrogen ($NO_2^-$—N), ammonia nitrogen ($NH_3$—N, $NH_4^+$—N) and nitrogen ingredients of cyanogen ($CN^-$) state, and organic materials of BOD (Biological Oxygen Demand) and COD (Chemical Oxygen Demand) induction ingredients. Accordingly, a water treatment apparatus and a water treatment method are required to remove these materials before the wastewater is discharged.

In the case of the water treatment apparatus and method, a biological treatment method is recommended to remove nitrogen ingredients. However, since the treatment cost is high, and the reaction time is long, there is a problem that the whole facility becomes large. In addition, the running condition is complicated by the hydrogen ion concentration (pH) control, or temperature or wastewater ingredients. Since microorganisms are extirpated in the case of wastewater containing poisonous materials or toxicants such as heavy metals or chloride ions, there is a problem that the kinds of wastewater to which the biological treatment method can be applied are limited.

In addition, an electrolytic device of the existing electro-chemical water treatment apparatus uses an electrode plate of a general metallic material, but such an existing electrode plate does not fulfill the demand for developing a recent new electrode plate that can improve electric power expense curtailment, durability, corrosion-resistance, abrasion-resistance, chemical resistance and life.

Further, in the case of the electro-chemical water treatment method of wastewater, efficient pre-treatment and post-treatment processes need to be systematically introduced in correspondence to components and states of wastewater, in order to treat various kinds of wastewater.

DISCLOSURE

Technical Problem

Therefore, to solve the above problems, it is an object of the present invention to provide an electro-chemical water treatment apparatus and method thereof, which can separate pollution materials rapidly from wastewater using a titanium electrode, a ceramic electrode or an electrode array that can be applied to an environment where an existing electrode cannot be used, or where an electrolyzer and an electrolysis system has problems such as an excessive electric power expense, or a temperature rise by generation of heat.

It is another object of the present invention to provide an electro-chemical water treatment apparatus and method thereof, including efficient pre-treatment and post-treatment processes according to components and states of wastewater.

It is still another object of the present invention to provide an electro-chemical water treatment apparatus and method thereof, which removes pollution materials contained in wastewater which pollutes a quality of water, to thereby prevent a secondary pollution material from being produced, and which performs a wastewater treatment process automatically, to thereby reduce a wastewater treatment expense.

It is yet another object of the present invention to provide an electro-chemical water treatment apparatus and method thereof, which uses a ceramic base material to thereby increase an electrode lifetime so that the lifetime can be extended semi-permanently in comparison with a general electrode lifetime of about 2-5 years, which uses a ceramic electrode to thereby greatly save an electric power expense at a level of 50-60% of that of a general electrode, in order to exhibit an identical electrolytic rate, and which enables a smooth electrification when an electrical conductivity of wastewater is high, to thereby improve a water treatment efficiency.

Technical Solution

To accomplish the above objects of the present invention, according to an aspect of the present invention, there is provided an electro-chemical water treatment apparatus comprising:

a wastewater collection reservoir that contains wastewater;

a wastewater storage retention reservoir that controls a hydrogen ion concentration (pH), an electrical conductivity and an amount of flow of wastewater that is supplied from the wastewater collection reservoir;

an electrolyte tank which supplies the wastewater with an electrolyte for making the electrical conductivity of the wastewater in the wastewater storage retention reservoir as an electrical conductivity at which an electrolysis can be achieved;

a hydrogen ion concentration (pH) conditioner tank that supplies a hydrogen ion concentration (pH) conditioner for the wastewater in the wastewater storage retention reservoir;

an electrolyzer including an anode plate and a cathode plate through which an anode direct current and a cathode direct current flow, respectively, when an electricity is applied to a bipolar electrode, and a number of electrodes which are arranged as an electrification body between the anode plate and the cathode plate, respectively, and which electrolyses the wastewater supplied from the wastewater storage retention reservoir; and a controller which grasps state of wastewater, controls level of the wastewater collection reservoir, controls the hydrogen ion concentration (pH), the electrical conductivity and the amount of flow of wastewater in the wastewater storage retention reservoir, and controls level of the electrolyzer and which is connected to the anode plate and the cathode plate to thereby control the electrolysis.

According to a second aspect of the present invention, there is also provided an electro-chemical water treatment method comprising:

(a) a pre-treatment process of performing a physical treatment or chemical treatment of original wastewater to facilitate electrolysis;

(b) a process of controlling an electrical conductivity of the wastewater that has undergone the pre-treatment process (a);

(c) a process of projecting a hydrogen ion concentration (pH) conditioner into the wastewater that has undergone the electrical conductivity control process (b) to thus control a hydrogen ion concentration (pH);

(d) a process of electrolyzing the wastewater having undergone the hydrogen ion concentration (pH) conditioner projecting process (c) by an electrolytic device which includes an anode plate and a cathode plate through which an anode direct current and a cathode direct current flow, respectively, when an electricity is applied to a bipolar electrode, and a number of electrodes which are arranged as an electrification body between the anode plate and the cathode plate, respectively; and (e) a post-treatment process of performing a post-treatment before discharging the wastewater that has undergone the wastewater electrolysis process (d).

Preferably but not necessarily, the physical treatment in the pre-treatment process (a) comprises the step of projecting coagulant and polymer into the original wastewater to facilitate an electrolysis, to thereby remove suspended solid (SS) and dissolved solid (DS) included in the original wastewater.

Preferably but not necessarily, the chemical treatment in the pre-treatment process (a) comprises a chemical treatment process having at least one of the steps of projecting NaCl or NaOCl into the original wastewater, to thereby control an electrical conductivity and remove non-degradable organic matters included in the wastewater, and projecting $Ca(OH)_2$ or $Ca(ClO)_2$, to thereby remove F, and projecting a bubble removal agent.

Preferably but not necessarily, the post-treatment process comprises at least one step selected from the steps of filtering the wastewater in order to remove sludge, aerating in order to supply air for the wastewater, and filtering the wastewater in order to remove additional remaining smell or residual chlorine, before discharging the wastewater.

Advantageous Effects

As described above, the electro-chemical water treatment apparatus and method thereof according to the present invention provides the following advantages.

Firstly, the present invention provides an electro-chemical water treatment apparatus which can separate pollution materials rapidly from wastewater using a titanium electrode, a ceramic electrode or an electrode array that can be applied to an environment where an existing electrode cannot be used, or where an electrolyzer and an electrolysis system has problems such as an excessive electric power expense, or a temperature rise by generation of heat.

Secondly, the present invention provides an efficient electro-chemical water treatment method by selectively performing respective pre-treatment and post-treatment processes according to components and states of wastewater.

Thirdly, the present invention provides an electro-chemical water treatment apparatus and method thereof, which removes pollution materials contained in wastewater, which pollutes a quality of water to thereby prevent a secondary pollution material from being produced, and which performs a wastewater treatment process automatically to thereby reduce a wastewater treatment expense.

Fourthly, the present invention provides an electro-chemical water treatment apparatus and method thereof, which uses a ceramic base material to thereby increase an electrode lifetime so that the lifetime can be extended semi-permanently, in comparison with a general electrode lifetime of about 2-5 years, which uses a ceramic electrode to thereby greatly save an electric power expense at a level of 50-60% of that of a general electrode, in order to exhibit an identical electrolytic rate, and which enables a smooth electrification when an electrical conductivity of wastewater is high, to thereby improve a water treatment efficiency.

DESCRIPTION OF DRAWINGS

The above and/or other objects and/or advantages of the present invention will become more apparent by describing the preferred embodiments thereof in detail with reference to the accompanying drawings in which.

BEST MODEL

Figure 1:
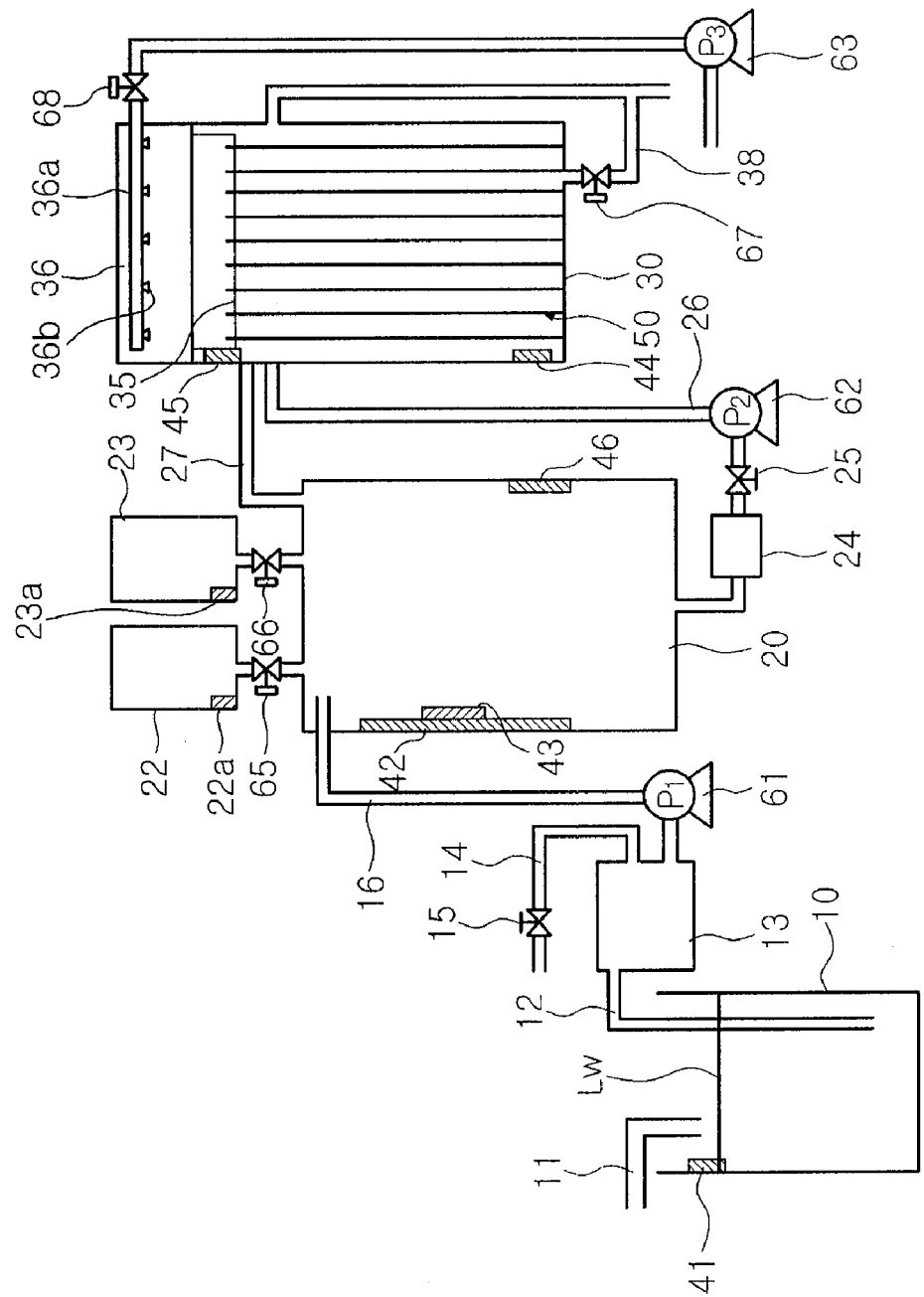
FIG. 1 is a schematic diagram for explaining an electro-chemical water treatment apparatus using a ceramic electrode according to an embodiment of the present invention.

Hereinbelow, an electro-chemical water treatment apparatus and method thereof according to respective preferred embodiments of the present invention will be described with reference to the accompanying drawings. Like reference numerals denote like elements through the following embodiments.

Figure 10:
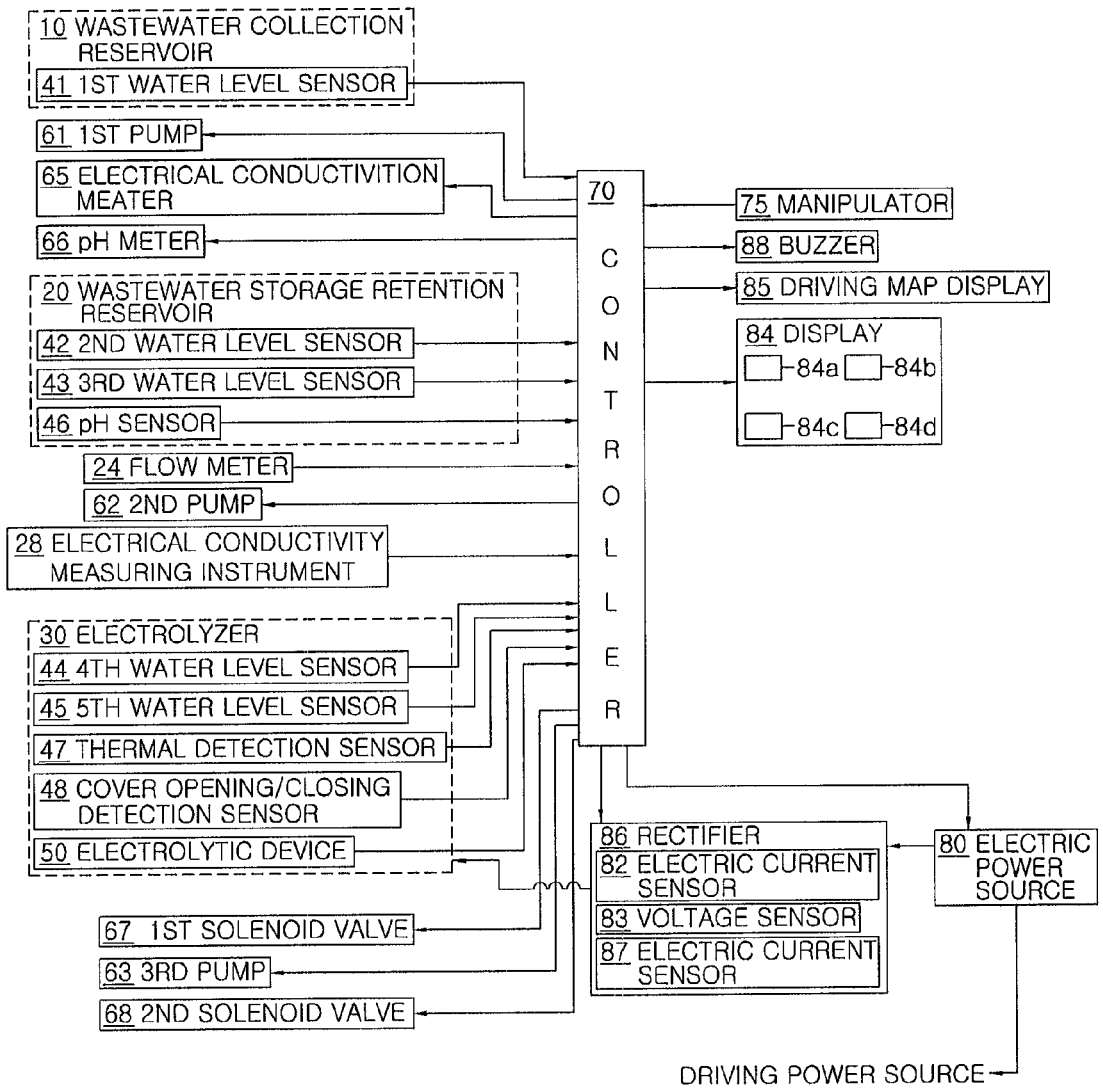
FIG. 10 is a block diagram showing a controller in an electro-chemical water treatment apparatus according to the present invention.

First, as shown in FIG. 1, an electro-chemical water treatment apparatus using a ceramic electrode according to the present invention, largely includes a wastewater collection reservoir 10, a wastewater storage retention reservoir 20, an electrolyzer 30, and a controller 70 (see FIG. 10).

The wastewater collection reservoir 10 temporarily contains wastewater which flows in via an inlet pipe 11 from a wastewater generation source. Here, a first water level sensor 41 is mounted in the wastewater collection reservoir 10 in order to keep the level of the contained wastewater at a certain level (Lw).

The wastewater exhausted through the wastewater collection reservoir 10 moves to a flow amount controller 13 through an outlet pipe 12. The flow amount controller 13 and the wastewater storage retention reservoir 20 are connected to a first connection pipe 16 and a first pump 61. Accordingly, the wastewater of the wastewater collection reservoir 10 moves to the wastewater storage retention reservoir 20 through the first pump 61.

The flow amount controller 13 is connected between the wastewater collection reservoir 10 and the first pump 61 to thus play a role of keeping an amount of wastewater which flows in by the first pump 61, at a certain rate. A manual valve 15 is connected to the flow amount controller 13 through a branch pipe 14.

The wastewater storage retention reservoir 20 controls an electrical conductivity of wastewater according to a given reference value and controls a hydrogen ion concentration (pH) according to a wastewater discharge standard, in order to electrolyze wastewater and discharge the electrolyzed wastewater. On top of the wastewater storage retention reservoir 20, an electrolyte tank 22, which supplies electrolyte in order to control an electrical conductivity and a hydrogen ion concentration (pH), and a pH conditioner tank 23 that supplies a pH conditioner are connected with an electrical conductivity meter 65 and a pH meter 66, respectively, using a fixed quantity pump or a general pump, respectively.

A pH sensor 46 that measures pH of wastewater is installed in the inside of the wastewater storage retention reservoir 20. A first level sensor 22a and a second level sensor 23a, which identify a residual quantity of the electrolyte and the pH conditioner are installed in the electrolyte tank 22 and the pH conditioner tank 23, respectively, in order to prevent the electro-chemical water treatment apparatus from malfunctioning due to shortage of the electrolyte or pH conditioner.

In addition, a quantity of wastewater contained in the wastewater storage retention reservoir 20 must keep a certain level of wastewater. The reason is because treatment of wastewater should be consecutively processed, and the electrolyte and the pH conditioner should be projected by respective certain amounts in correspondence to a quantity of wastewater that flows in to keep an electrical conductivity and a hydrogen ion concentration (pH) of the wastewater at certain values. For this reason, the level of the wastewater in the wastewater storage retention reservoir 20 should be kept within a certain range.

For this purpose, a third water level sensor 43 is installed in the wastewater storage retention reservoir 20, in order to sense level of the wastewater within an allowable certain range. The controller 70 controls the first pump 61 to thus manage the level of the wastewater within a certain range.

Meanwhile, during running of the water treatment apparatus system, the level of the wastewater storage retention reservoir 20 may be kept lower or higher than a lower limit value or upper limit value, respectively. For example, the water level may become higher than the upper limit value when the first pump 61 excessively runs or a discharge amount of the first pump 61 decreases, but the water level may become lower than the lower limit value when an amount of wastewater flowing out to the electrolyzer 30 is larger than an amount of wastewater flowing in to the wastewater storage retention reservoir 20 through the first pump 61.

In this case, the low limit value and the upper limit value of the water level are detected by the second water level sensor 42. Here, the controller 70 controls the water level of the wastewater storage retention reservoir 20 within a certain range of water level through the third water level sensor 43. The controller 70 stops running of the electro-chemical water treatment apparatus if the second water level sensor 42 detects that the water level of the wastewater storage retention reservoir 20 becomes lower than the lower limit value or higher than the upper limit value, and simultaneously makes an alarm for an administrator through a buzzer 88, to thereby make the administrator take action.

Meanwhile, in the case of removing ammonia nitrogen, it is preferable that pH of the wastewater in the wastewater storage retention reservoir 20 is kept in a range of 10-11 which is higher than a pH value of neutrality.

The reason is because pH descends when removing ammonia nitrogen among the wastewater ingredients. A decomposition velocity becomes fast when that initial pH is somewhat high in the range of 9-11 or so, and a pH descending degree differs according to an initial concentration of ammonia nitrogen. The decomposition velocity is enhanced when $NH_3$—N is 500-300 ppm (parts per million).

Another reason is because a state of chlorine that exists in the wastewater differs according to pH in the case of chlorine. Chlorine exists in an $OCl^-$ form in case of alkalinity and chlorine exists in a $HOCl$ form in case of acidity. Here, when that pH drops lower and becomes not more than 4, chlorine exists in a $Cl_2$ form and $Cl_2$ is discharged in a poisonous gaseous form.

Therefore, in order to discharge gas produced during electrolysis in a non-stimulating gas form, an ammonia removal speed should be considered and pH of discharged water after electrolysis should be considered.

Meanwhile, when decomposing nitrate nitrogen, as decomposition proceeds, pH is increased. In the case of nitrate nitrogen of high concentration, a decomposition velocity is fast when pH is low as 4-5 or so. However, since a decomposition rate is prior to occurrence of irritant gas, it is more preferable that pH is kept low.

Similarly, when decomposing organic matters or non-degradable organic matters, a pH control range of influent wastewater changes according to the composition of organic matters and the kind of the wastewater.

Here, gas that is produced in the electrolysis process can be purified using a wet gas scrubber.

Figure 2:
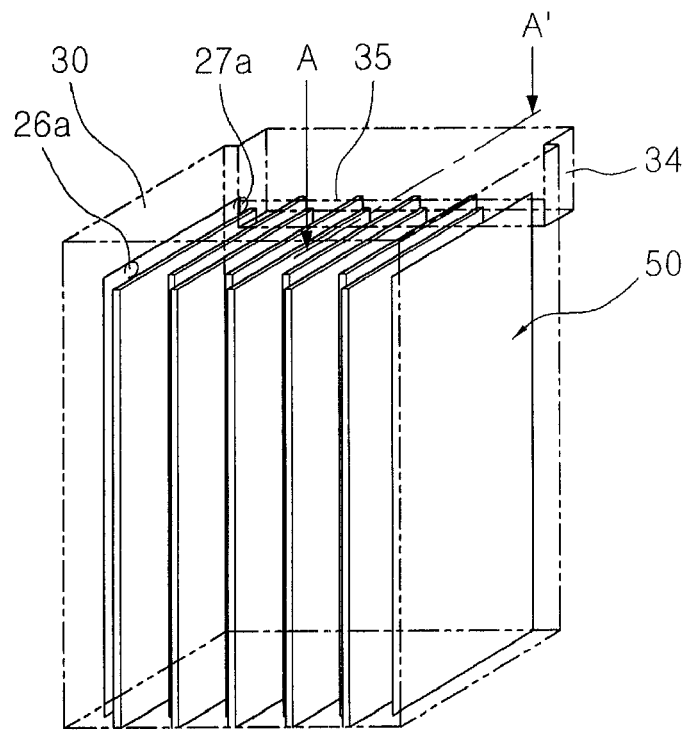
FIG. 2 is a perspective view for explaining a structure of an electrolyzer illustrated in FIG. 1.

The electrolyzer 30 has an electrolytic device 50 that electrolyses wastewater therein. As illustrated in FIG. 2, an inlet 26a and an outlet 27a are formed at a height lower than height of the top portion of the electrolytic device 50, and are linked with the wastewater storage retention reservoir 20 through the second connection pipe 26 and an outlet pipe 27, respectively.

The second pump 62 that transfers wastewater of the wastewater storage retention reservoir 20 to the electrolyzer 30 is connected to the second connection pipe 26.

Figure 3:
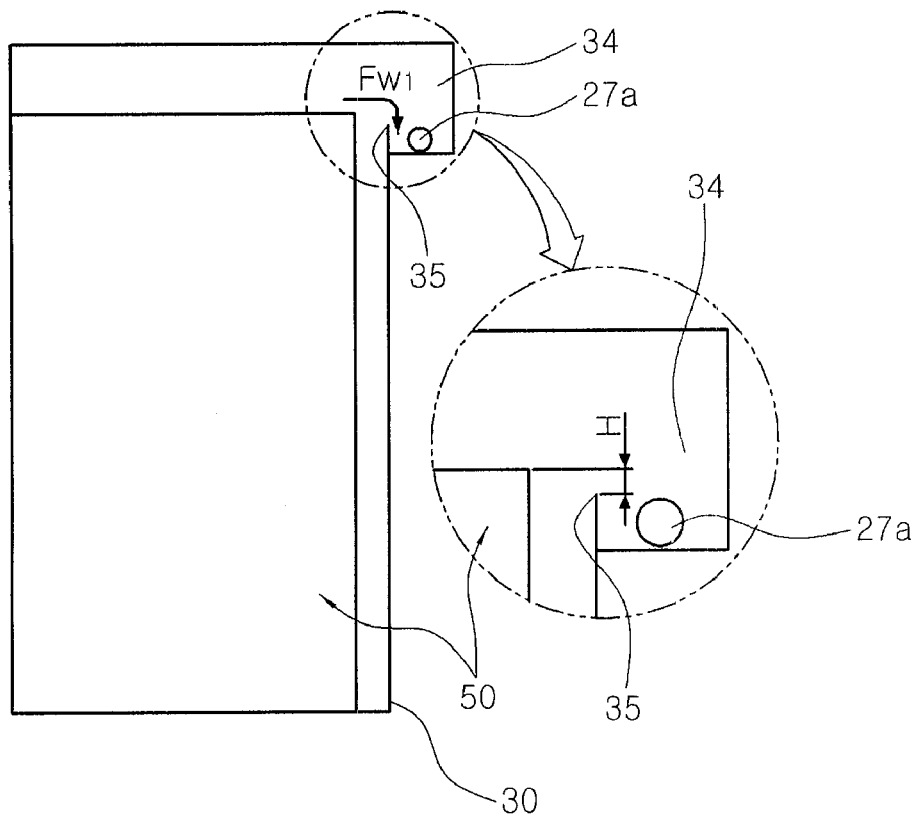
FIG. 3 is a cross-sectional view cut along a line A-A of FIG. 2.

In addition, a washer 36 that can project a bubble removal agent is installed on top of the electrolyzer 30 for when the electrolytic device 50 is washed or bubbles excessively occur during electrolysis. As shown in FIG. 3, an overflow step 35 is formed at one side of the upper end of the electrolyzer 30, at a height (H) a little lower than the height of the upper end of the electrolytic device 50. Accordingly, if too much wastewater flows in the electrolyzer 30, surplus wastewater ($Fw_1$) passes over the overflow step 35 and moves to an overflow chamber 34. The surplus wastewater ($Fw_1$) which moves to the overflow chamber 34 returns to the wastewater storage retention reservoir 20 through a return pipe 27.

If wastewater overflows through the overflow step 35 as described above, such an overflow is sensed by a fifth water level sensor 45. A flow meter 24 is connected between the wastewater storage retention reservoir 20 and the second pump 62 in order to prevent the overflow. Accordingly, an amount of flow supplied to the electrolyzer 30 is measured in order to control the amount of flow to prevent overflow. In addition, a flow control valve 25, which can be manually opened and closed, is connected between the flow meter 24 and the second pump 62. Accordingly, a quantity of wastewater, which flows in the second pump 62, is manually established to thus prevent the overflow.

The washer 36 is placed on the upper portion of the electrolytic device 50 in the electrolyzer 30 and is used to wash an anode plate 51, a cathode plate 53, and a number of electrodes 52a and 52b that constitute the electrolytic device 50. Further, the washer 36 is used to project a bubble removal agent when an excessive number of bubbles occur during electrolysis.

The reason for projecting the bubble removal agent to thus remove bubbles is because oxygen and hydrogen are generated by a side reaction at electrolysis. Thus bubbles that contain oxygen and hydrogen, which have a danger of explosion, are severely induced when a surface active agent has been included in wastewater.

However, once a surface active agent is included in wastewater, it is difficult to remove the surface active agent from the wastewater. Accordingly, a bubble removal agent is mixed to the wastewater before electrolysis, and the wastewater is made to circulate in the inside of an electrolysis reactor. Then, the wastewater is sprayed at a high pressure to remove bubbles using a number of bubble removal nozzles 36b whose spray directions are set toward the electrolytic device 50, a distribution pipe 36a that supplies the number of bubble removal nozzles 36b with cleaning water, a second solenoid valve 68 that controls a cleaning water supply with respect to the distribution pipe 36a, and a third pump 63 that supplies high pressure water to the second solenoid valve 68 when cleaning water is not high pressure water (but is not an unnecessary component in the case that the cleaning water is high pressure water).

Meanwhile, because the life-time of the respective electrodes is rapidly shortened when electrolyzing wastewater including fluorine (F—), $Ca(OH)_2$ or $Ca(ClO)_2$ are used to remove fluorine and fluorine is precipitated in a $CaF_2$ form. Here, a polymer can be used to improve precipitation.

Meanwhile, an electric power consumption consumed for electrolysis is an important factor which may affect the total cost for maintaining an electro-chemical water treatment apparatus. In this connection, electrical conductivity is very important. As electrical conductivity is high, a target electrolytic rate can be obtained using a low voltage. On the contrary, if electrical conductivity is low, a relatively high voltage is needed to obtain an identical electrolytic rate. Accordingly, much electric power is consumed.

Therefore, to reduce an electric power expense, electrical conductivity should be heightened by using a support electrolyte illustrated in Table 1, when the electrical conductivity of wastewater is low. Here, although expenses of chemicals increase according to use of the support electrolyte, the electrical conductivity of wastewater becomes high when using the chemicals, to thereby obtain a remarkable decreasing rate of electric power expenses.

TABLE 1

| for Aqueous Solution | |
|---|---|
| 1. Neutral | $NaClO_4$ or $KNO_3$ |
| 2. Acetate | 2M HOAc + 2M $NH_4OAc$ |
| 3. Ammonia | 1M $NH_3$ + 1M $NH_4Cl$ |
| 4. Chloride | 0.1M KCl or NaCl |
| 5. HCl | 1M HCl |
| 6. Citrate | Citric acid + Ammonium citrate, pH = 4 |
| 7. Citrate | Same, pH = 6 |
| 8. EDTA | 0.1M EDTA, pH = 7 |
| 9. Hydroxide | 1M KOH or NaOH |
| 10. Oxalate | 0.25M Oxalic acid + $(NH_4)_2$-Oxalate, pH = 4 |
| 11. Phosphate | 7.3M $H_3PO_4$ |
| for Non-aqueous Solution | |
| LiCl, $Me_4NClO_4$, $Bu_4NI$, $LiClO_4$, according to solubility | |

Meanwhile, an economical treatment speed cannot be obtained using only a direct response by electrodes in order to remove total nitrogen (TN) ingredients, COD induction ingredients and non-degradable organic matters using electrolysis. Therefore, an indirect oxidation method should be induced.

However, chloride ions $Cl^-$ are needed to induce such an indirect oxidation method. If the chloride ions exist in wastewater, they are converted into a chlorine gas $Cl_2$ in the anode plate of the electrolyzer. The converted chlorine gas melts in water to thus form free chlorine. In addition, the converted chlorine gas exists as hypochlorouse acid HOCl or hypochlorouse acid ion $OCl^-$ according to pH and reacts with underwater ammonia nitrogen to change ammonia to gaseous nitrogen.

Therefore, considering expenses, NaCl is good as a support electrolyte that can supply chloride ions that heighten an electrical conductivity. When chemicals such as NaOCl and $Ca(ClO)_2$ are used as the support electrolyte, an electrical conductivity cannot be only increased but also a certain amount of TN ingredients or COD ingredients are removed, or a non-degradable substance is converted into a biodegradable substance, to thereby reduce a load of electrolysis.

In addition, a thermodetection sensor 47 is installed in the electrolyzer 30. The thermodetection sensor 47 is inserted into a portion where wastewater is contained in the electrolyzer 30, and measures temperature of the inside of the wastewater in order to determine a state of the wastewater. If the measured temperature is not less than a certain temperature, the thermodetection sensor 47 sends a signal to the controller 70 to intercept the electro-chemical water treatment apparatus.

The thermodetection sensor 47 turns off the whole system including the electro-chemical water treatment apparatus according to the temperature of the wastewater. The whole system including the electro-chemical water treatment apparatus is reactivatated after having determined and removed the causes of a relevant temperature rise. If an electrolysis continues and is stabilized, part of the electrical energy that is supplied to the electrolyzer 30 is degenerated into heat, to thus increase temperature of the wastewater. Accordingly, there is a difference between the temperature of the wastewater flowing in the electrolyzer 30 and the temperature of the discharged wastewater. If wastewater does not flow in the electrolyzer 30 or an amount of wastewater flowing in the electrolyzer 30 is less than a set flow, that is, if the electro-chemical water treatment apparatus runs at abnormal state, the temperature of the wastewater in the inside of the electrolyzer 30 becomes higher than a normal temperature. In other words, the temperature of the wastewater in the inside of the electrolyzer 30 is measured and then the whole system including the electro-chemical water treatment apparatus is turned off or re-activated according to the measured temperature of the wastewater.

Meanwhile, electricity is mostly applied to the electrolyzer 30 at the time of system operation. Thus, if a cover of the electrolyzer 30 in the electrolysis system is carelessly opened and closed, an operator may be endangered. Accordingly, in order to detect a state of opening and closing the cover of the electrolyzer 30 and to avoid additional safety problems, a cover opening and closing detection sensor 48 employing a magnetic sensor is installed in the cover of the electrolyzer 30.

Here, the reason of installing the cover opening and closing detection sensor 48 is to prevent a system overheat phenomenon which may occur due to a shortage of original water supply at the time of installing electrodes, maintenance of a reactor, and running of the reactor, or due to carelessness of an operator insufficiently tightening the electrodes and an electric power source 80, and danger circumstances such as calorification and explosion by creation of sludge that can occur due to components and states of wastewater at the time of activating of the electrolyzer 30.

The cover opening and closing detection sensor 48 is installed in the cover of the electrolyzer 30. Accordingly, when the cover of the electrolyzer 30 is opened or closed, is damaged, and is not closed properly, (i.e., when the cover of the electrolyzer 30 is separated from the main body of the electrolyzer 30 or is thermally deformed), a short-circuit is induced and electric power is not applied to the system itself, to thereby intercept an unnecessary harmful circumstance from occurring.

In other words, in this invention, the cover opening and closing detection sensor 48 detects a short-circuit of a contact point due to the fact that the cover of the electrolyzer 30 is opened or closed, is damaged, and is not closed properly. In this case, the cover opening and closing detection sensor 48 detects a short-circuit of a contact point beforehand, and makes the controller 70 intercept all electric power for the system and the system stop operation thereof, so that the electric power is not supplied for the system to avoid additional safety problems, and to thereby prevent an unnecessary harmful circumstance from occurring.

A rectifier 86 also plays a role of applying necessary energy at electrolysis to wastewater through electrodes. The rectifier 86 is established to have a low/high value for voltage and current of the rectifier 86. Accordingly, the rectifier 86 plays a role of functioning as a safety device which safely maintains and uses the electrodes and rectifier of the system.

The rectifier operates as one selected from a constant voltage mode in which the rectifier runs according to a fixed voltage value and a constant current mode in which the rectifier runs according to a fixed current value, depending upon a cite condition and a decomposition feature of a substance to be decomposed in wastewater. Since the current value is fixed under the constant current mode, change of the voltage value is accompanied by changes of flux of wastewater, electrical conductivity, water temperature in the reactor, superannuation of electrodes, etc. Change of the current value occurs with respect to changes of the same factors as those of the constant current mode under the constant voltage mode.

In general, the rectifier 86 is established to have a low/high value for the voltage value at the constant current mode, and is established to have a low/high value for the current value at the constant voltage mode. In order to additionally limit a current operation range of a user at the constant current mode, a low/high value for the current value is established in the rectifier 86. In order to additionally limit a voltage operation range of a user at the constant voltage mode, a low/high value for the voltage value is established in the rectifier 86 in parallel.

In addition, a low/high value for the operation voltage value and the operation current value of the rectifier, which is accomplished considering an operation mode, is established so that an excessive electric current or voltage is not applied to the system due to change of an unintended factor of the operator. In addition, the upper limit and low limit of the low/high value are specified so that the rectifier can be prevented from overheating in relation to the intensity of the current even at operation of the rectifier under a very low voltage. Accordingly, a peak value of power consumption on site is estimated, a stability of the rectifier is assumed, and an overheat prevention is induced in the reactor. Existence and nonexistence of the system may be controlled on the basis of the established low/high value of the rectifier as necessary.

Meanwhile, an electrical conductivity generally means a degree that electricity can pass through wastewater as a medium at electrolysis. The electrical conductivity can be described from the viewpoints of safety and system efficiency. From the viewpoint of the safety of the electrical conductivity, the electrical conductivity functions as a factor which determines an operation circumstance of the rectifier and service conditions of the electrolysis system, together with the establishment of the voltage, current and low/high value of the rectifier.

That is, the electrical conductivity should be controlled from the viewpoints of safety and cost in terms of features of the electrolysis system as well as the system efficiency. The upper limit and low limit value of the low/high value of the rectifier should be established at the step of judging existence and nonexistence of appropriateness of the system re-activation and operation, in order to maintain smooth operation circumstances.

Here, the electrical conductivity of wastewater flowing in the reactor is measured by an electrical conductivity measuring instrument 28. Whether or not the system is activated is determined on the basis of the value obtained through the electrical conductivity measuring instrument 28. An abnormality of the electrical conductivity value obtained through the electrical conductivity measuring instrument 28 can be described in connection with a running mode of the rectifier.

As an example, the electric current value is decreased when the conductivity value is lower than the set point at the constant voltage mode, and the electric current value is increased when the former is higher than latter. On the contrary, the electric voltage is increased when the conductivity value is lower than the set point at the constant current mode, and the electric voltage value is decreased when the former is higher than latter.

In particular, rising of a sudden voltage value due to shortage of the electrical conductivity and fall of a sudden voltage value less than about 60% of a use voltage applied to a general rectifier, at the constant current mode, may cause an abnormal operation of the whole system and overheating of the rectifier, and accompanies a side effect of increasing an electric power consumption.

Figure 4:
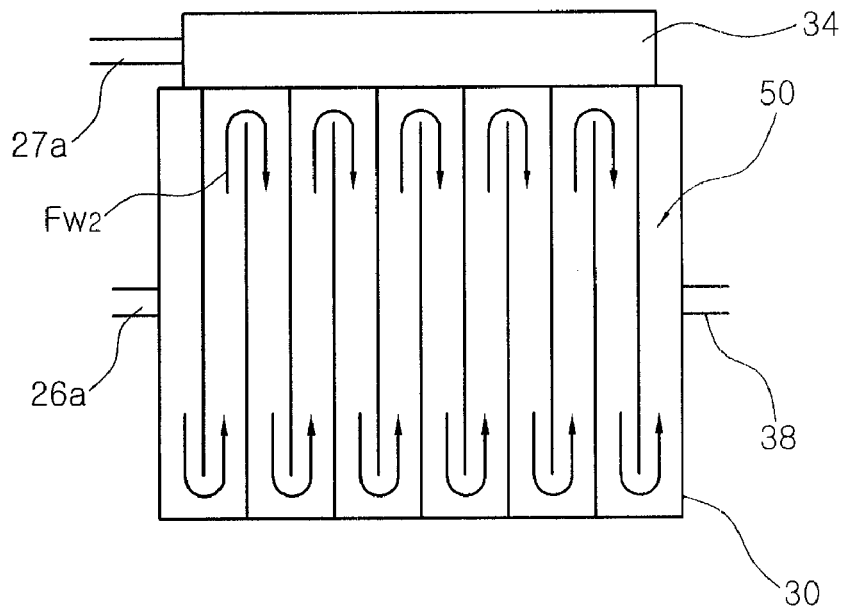
FIG. 4 is a plan view for explaining a structure of an electrolytic device and a stream of wastewater of electrolytic device in the electrolyzer illustrated in FIG. 1.
Figure 5:
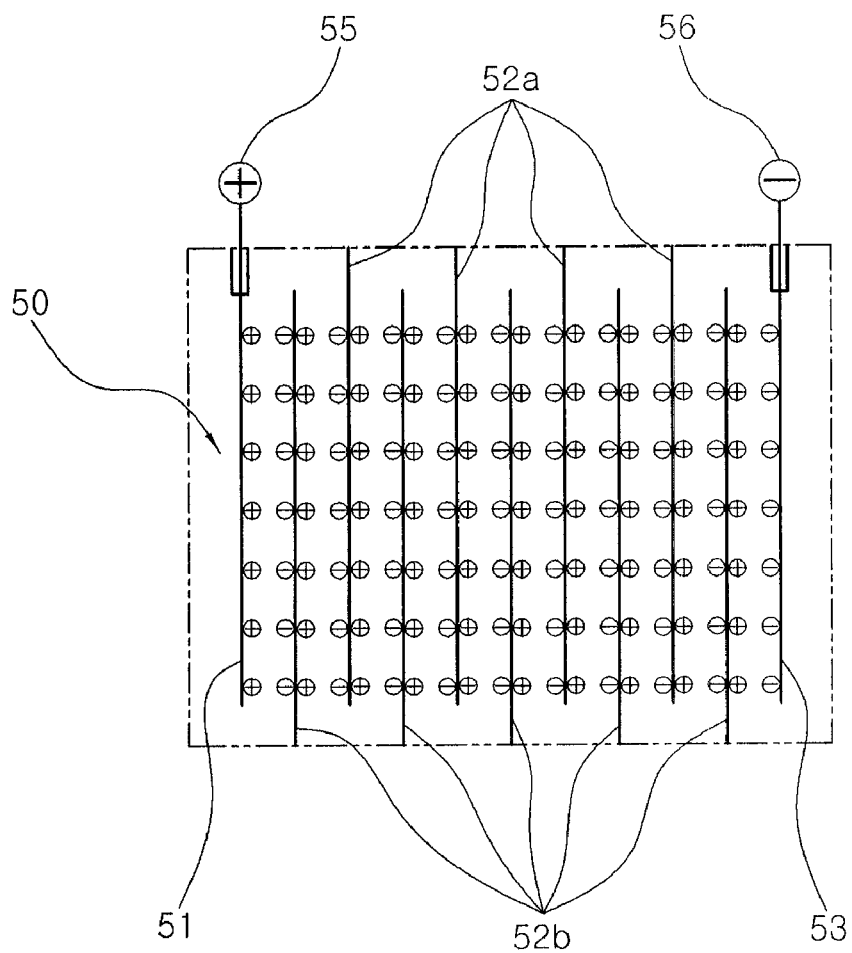
FIG. 5 is a plan view for explaining an electrical connection state of the electrolytic device and an electrification state of the respective electrode plates which are illustrated in FIG. 4.

As shown in FIGS. 4 and 5, the electrolytic device 50 includes a number of electrode plates. Each electrode plate includes an anode plate 51 which is placed at one side of the electrode plate and to which a direct current (DC) is applied, a cathode plate 53 which is placed at the other side of the electrode plate and to which a direct current (DC) is applied, and a number of electrodes which are disposed between the anode plate 51 and the cathode plate 53. The electrodes are formed of a plate shape and may be made of a titanium electrode or a ceramic electrode.

In FIG. 5, the electrode plate includes a first ceramic electrode 52a, a second ceramics electrode 52b, an anode pole 55 which applies a DC positive potential to the anode plate 51, and a cathode pole 56 which applies a DC negative potential to the cathode plate 53. The anode plate 51, the cathode plate 53, and one end of the electrification plate 52a of the first ceramic electrode closely contact the inner surface of the rear surface of the electrolyzer 30. On the contrary, the second ceramic electrode 52b closely contacts the inner surface of the front surface of the electrolyzer 30. If one end of the components of the number of electrode plates closely contacts the inner surface of the front and rear surfaces of the electrolyzer 30, respectively as described above, a water path is formed in a zigzag form between the inlet 26a and the outlet 27a. Therefore, the wastewater that flows in through the inlet 26a flows in between the anode plate 51 and the first electrode of the second ceramic electrode 52b and sequentially moves along the water path formed in a zigzag form by the first ceramic electrode 52a and the second ceramic electrode 52b to then be output in the direction of the outlet 27a.

The first and second ceramic electrodes 52a and 52b are formed of ceramics as a base material. An insoluble oxide catalyst coating layer is formed on the surface of the ceramic base material. The insoluble oxide catalyst coating layer has an excellent electrical conductivity, and prevents electric current from flowing in the ceramic base material which is a non-conductor, to thus minimize loss of the electric current, and simultaneously induces the electric current only on the surface where an electro-chemical reaction occurs, to thus minimize electric power consumption expenses and to thereby prevent a temperature rise by calorification of electrodes.

The coating layers of the first and second ceramic electrodes 52a and 52b, are formed of an Ir compound, a Ru compound, and a Sn compound as main ingredients, respectively, and are formed of a compound including at least one selected among a Ti compound, a Mo compound, a Ta compound. and a Zr compound, in addition to the main ingredients.

In addition, each element of the first and second ceramic electrodes 52a and 52b according to the present invention can use various compounds, that is, nitride, sulfide, hydride, chloride, etc., that can supply precious metallic ions or metallic ions. Preferably, chloride is used as each element of the first and second ceramic electrodes 52a and 52b.

The coating layers of the first and second ceramic electrodes 52a and 52b should be formed of such a thickness that exfoliation does not happen with respect to the base material and the electric current can be transmitted through the coating layers. An erosion or corrosion can be prevented from occurring due to the friction of the ceramic electrodes used in the water treatment field with the ionic compounds out of an aqueous solution only when the coating layers have a certain thickness, respectively. An attachment and detachment phenomenon can be prevented from occurring due to minute hydrogen air drops which are generated from the surface of the electrodes, respectively.

It is preferable that thickness of the coating layer is approximately 3-10 μm. However when the thickness of the coating layer is less than 3 μm, the coating layer may be damaged by friction or hydrogen air drops. When the thickness of the coating layer is more than 10 μm, coarse crystal grains or absurd crystal grains are formed due to hardening during the thermal decomposition process of the compound, and thus the coating layer may be exfoliated.

As described above, the coating layers are formed on surface of the ceramic material of the first and second ceramic electrodes 52a and 52b, to thus provide excellent corrosion resistance, durability of abrasion, chemical resistance, etc. The first and second ceramic electrodes 52a and 52b can be used as particle filling electrodes for electrolysis. Electrons and charges on the surface of the ceramic material can be controlled by a method of electrifying electricity in a solution or a conductive medium instead of a direct application of electricity. Further, a compound having a variety of compositions is coated on the surface of the ceramic material, to thereby improve an electrolysis efficiency.

Also, alumina beads, zirconia beads, other ceramic or zeolite beads, or a variety of shapes of ceramic supports of cylindrical, oval, tetrapod, hexahedron shapes, etc., can be used as the first and second ceramic electrodes 52a and 52b, including a plate type shown in FIG. 2.

In addition, the ceramic base material is formed by compressing and molding powder of a single or composite ingredient selected among alumina, taitania, zirconia, zeolite, mullite, ferrite, and silica.

In other words, the electrode is made of a ceramic electrode, and the shape of the electrode is formed of any one that is selected among a bead shape, a cylindrical shape, an oval shape, a tetrapod shape, and a hexahedron shape. The wastewater passes through the gaps that are formed between the ceramic electrodes, to thereby be electrolyzed.

A method of manufacturing the first and second ceramic electrodes 52a and 52b will be described below. An Ir compound, a Ru compound, and a Sn compound is made of a main ingredient for a ceramic base material that becomes a base, and a coating liquid obtained by mixing at least one selected among a Ti compound, a Mo compound, a Ta compound and a Zr compound with an organic solvent, is coated on the surface of the ceramic base material and then dried. Then, the coating liquid coated ceramic base material is processed according to a primary thermal treatment step of giving a coherence between the coating liquid which has been dried at low temperature and the ceramic base material, a repeating step of repeating the primary thermal treatment step by 4-15 times, and then a final thermal treatment step of sufficiently growing the coated oxide particles and thus giving an excellent coherence and surface intensity.

The primary thermal treatment is performed after having coated and dried the coating liquid coated on the ceramic base material. At the primary thermal treatment, a coating layer of a predetermined thickness is formed for 10-30 minutes at a temperature of 400-700° C. under the oxidizing atmosphere. Such a coat-dry-thermal treatment process is repeated 4-15 times. In addition, the final thermal treatment is performed for 3-10 hours at a temperature 400-700° C. under the oxidizing atmosphere.

As shown in FIGS. 2 through 5, the ceramic electrode 50 is formed of a plate shape, for example, but the ceramic electrode 50 of a bead shape can be installed in the electrolyzer 30. In such an occasion, gaps "A" (see FIG. 7) are formed between the ceramic electrodes 50. Accordingly, the ceramic electrodes need not be disposed in a zigzag form but a desired number of the ceramic electrodes having a bead shape can be projected into the electrolyzer 30, to thereby improve a workability of an assembly.

Figure 6:
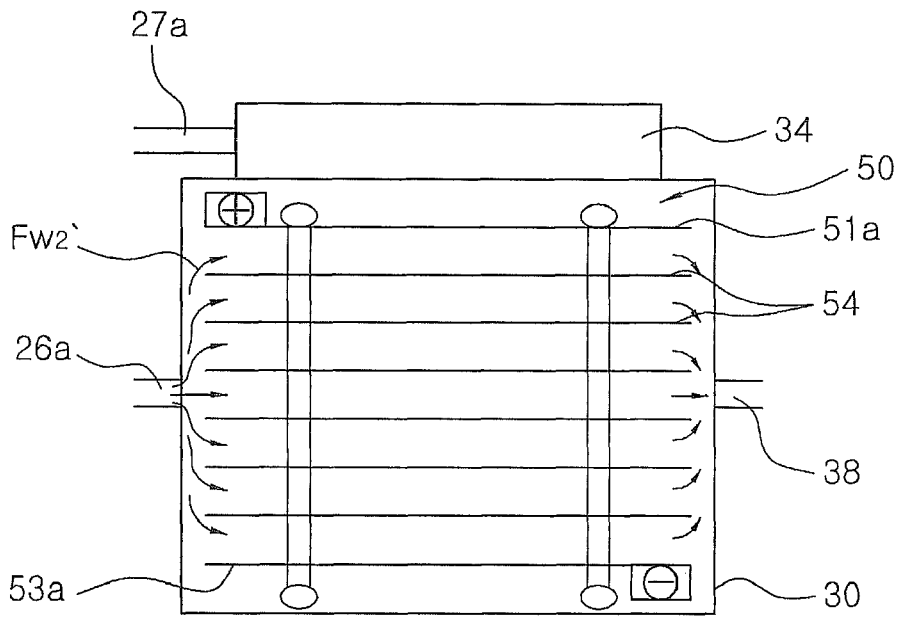
FIG. 6 is a plan view for explaining a structure of an electrolytic device and a stream of wastewater in the electrolytic device according to another example of the electrolyzer illustrated in FIG. 1.

FIG. 6 is a plan view for explaining a structure of an electrolytic device and a stream of wastewater in the electrolytic device according to another example of the electrolyzer illustrated in FIG. 1.

Referring to FIG. 6, suspended solid (SS) matters rise up by an electric flocculation effect at the time of performing an electrolysis in the electrolyzer 30, to thus form scum. In this case, the anode plate 51a, the cathode plate 53a and the electrode 54 of the ceramic electrode 50 are arranged in the direction of the flow ($Fw_2'$) of the wastewater which flows in the electrolyzer 30, to thus make it easy to discharge the scum or sludge.

In the case that suspended solids or soluble solids, which are expected into flocculation by a pre-process, are not smoothly removed at the time of an electrolysis process in view of the wastewater features, a scum removal apparatus (not shown) can be further installed in order to efficiently remove scum or the kind which is floated and flocculated in the inside of the reactor of the electrolyzer 30.

The scum removal apparatus reciprocates to the left and right or at a parallel state in the inside of the electrolyzer 30 where scum is expected to occur. Accordingly, scum is pushed out in the side surface of the electrolyzer 30 and then removed. According to the quality of the material of the scum removal apparatus, rubber is attached to a synthetic resin frame having no corrosion. The scum removal apparatus is designed to be driven by a motor or manually. Additionally, a cleaning water supply apparatus is separately attached in order to perform a smooth discharge of scum and a cleaning of the scum removal apparatus.

Figure 7:
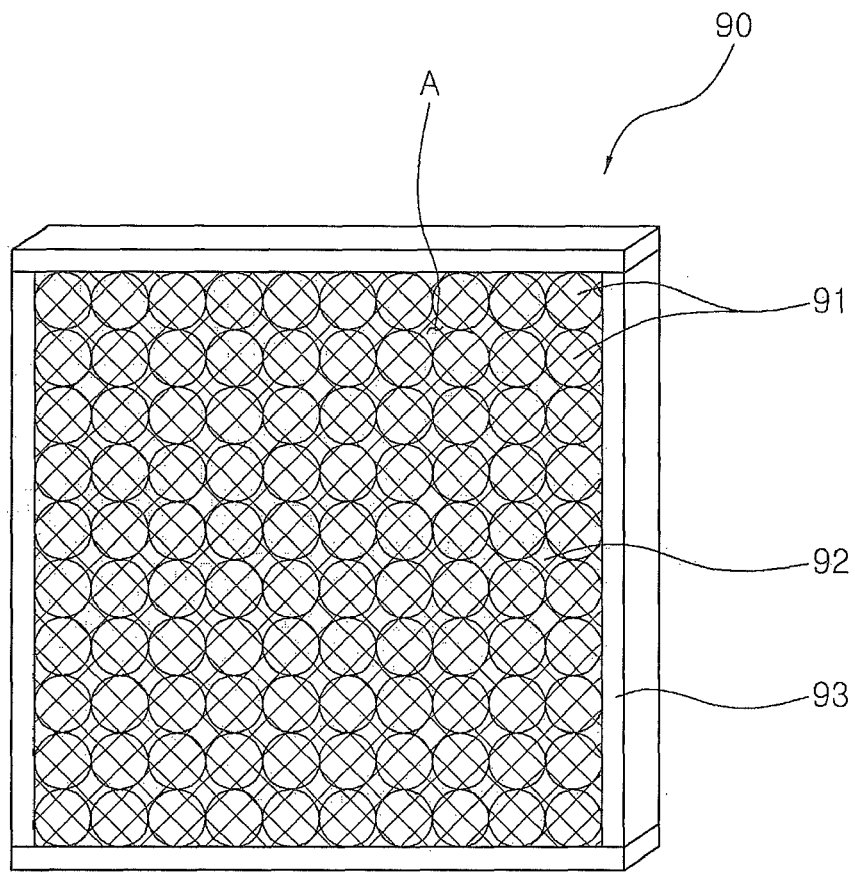
FIGS. 7 through 9 are perspective views illustrating an electrode array according to another example of an electrification body illustrated in FIG. 2.

FIG. 7 is a perspective view illustrating an electrode array 90, which is another example of the first and second ceramic electrodes 52a and 52b.

Referring to FIG. 7, the electrode array 90 is made by filling a number of ceramic electrodes 91 of bead shapes on the surface of which the chloride coating layer is formed in order to have an excellent electrical conductivity in a frame 93 in a mono layer form, and fixing the number of ceramic electrodes 91 using a fixing mesh 92.

The electrode array 90 is formed so that wastewater may pass through gaps "A" formed between the ceramic electrodes 91. Even if a number of the electrode arrays 90 are combined in parallel with one another, flow of wastewater is not so difficult. Even if the number of the electrode arrays 90 is not disposed between the anode plate and the cathode plate in the electrolyzer 30 in a zigzag form, wastewater can be passed through the gaps "A."

It is preferable that the quality of the material of the frame 93 and the fixing mesh 92 is polycarbonate, polyethylene, polypropylene, ABS (Acrylonitrile Butadiene Styrene) copolymer etc. provide chemical resistance and insulation as a polymeric material.

Figure 8:
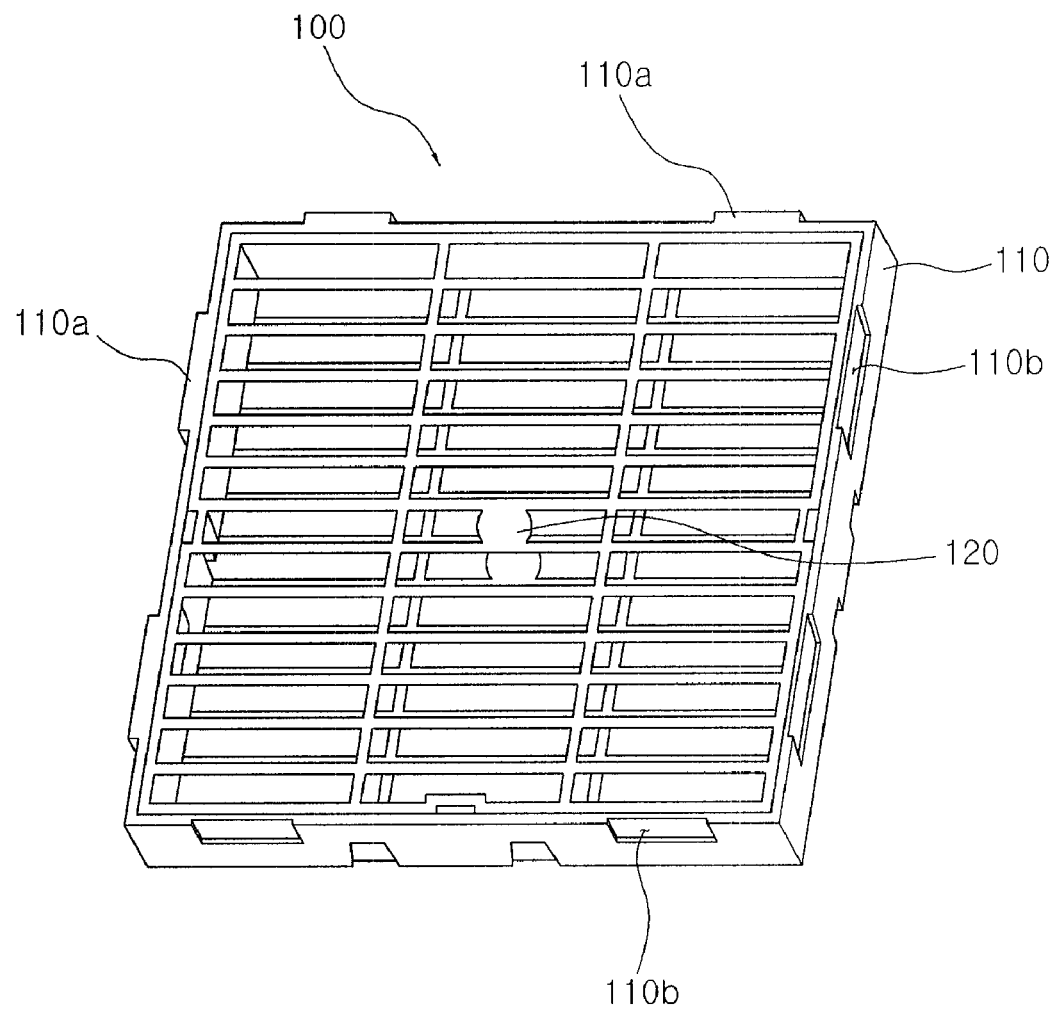

FIG. 8 is a perspective view illustrating another example of an electrode array 90. An electrification plate 100 in the electrode array 90 can contain ceramic electrodes of a bead shape therein. The electrification plate 100 includes a frame 110 having fitting protrusions 110 formed on the outer side thereof, fitting grooves 110b which can be coupled with the fitting protrusions 110a on an electrification plate of another neighboring electrode array in correspondence to the fitting protrusions 110a, and a fixing mesh 120 of a grid pattern which is coupled with the front and rear surfaces of the frame 110, respectively and fixes the ceramic electrodes 91 (see FIG. 7).

Figure 9:
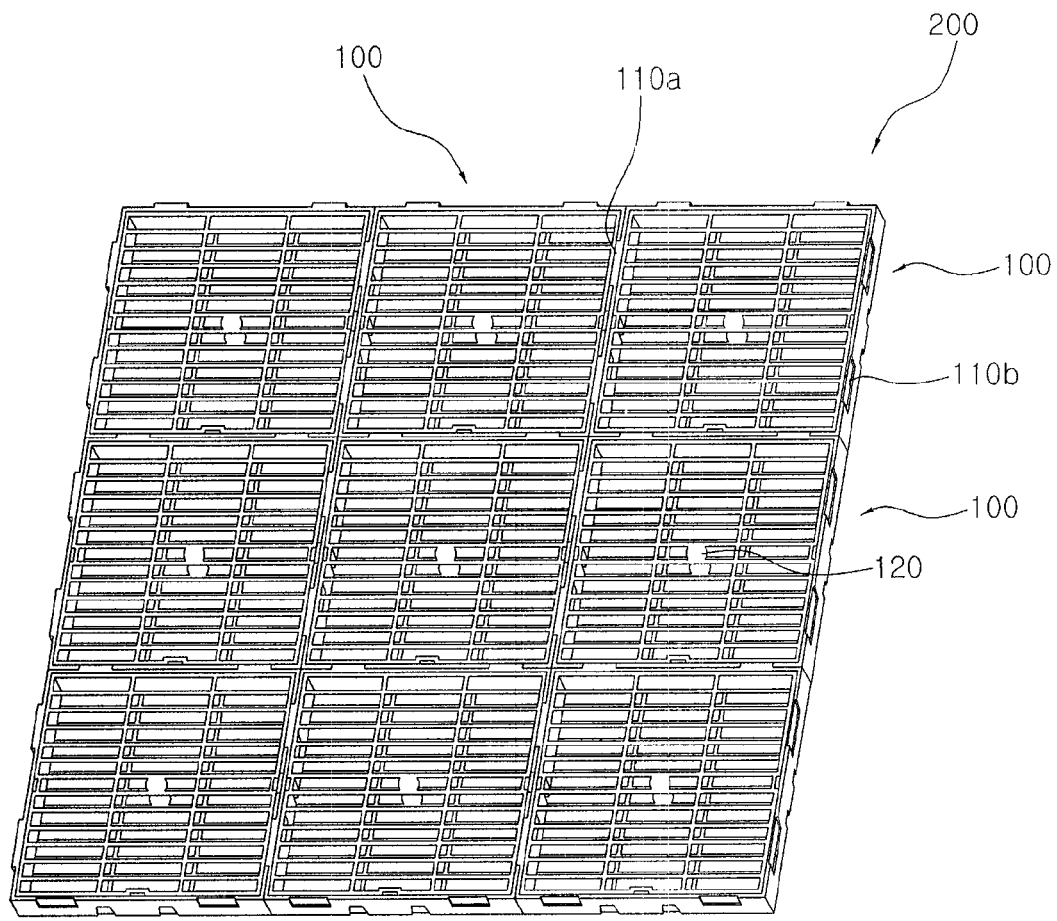

FIG. 9 is a perspective view illustrating an electrode array assembly plate 200 that is manufactured by combining a number of the electrode array electrification plates 100 and is used as a large area. The electrode array assembly plate 200 is formed by combining the fitting protrusions 110a of another neighboring electrode array electrification plate 100 into the fitting grooves 110b of the electrode array electrification plate 100, thereby conveniently assembling the electrode array electrification plate 100 with another neighboring electrode array electrification plate 100, according to an area and a capacity of the electrode array.

In the case of the electrode array electrification plate 90 or 100 using the ceramic electrodes according to a preferable embodiment of the present invention, the ceramic electrodes 91 are electrically conducted by an electrification effect in an aqueous solution to which electricity is applied. Accordingly, it is difficult to directly apply electricity to the ceramic electrodes 91 of a bead shape which are a non-conductor, respectively.

Therefore, the ceramic electrodes 91 should be able to be fixed for practical use of the ceramic electrodes 91 by a bipolar type. The electrode array electrification plate 100, according to the present invention, maintains a shape of the ceramic electrodes 91 using the frame 93 or 110 and the ceramic electrodes 91 of a bead shape considering that the ceramic electrodes 91 should be able to be fixed, and can maximize flow of electric current without influencing upon formation of the water path.

In this case, the respective frames 93 and 110 of the electrode array 90 and the electrode array electrification plate 100 should have hardness against weight of the ceramic electrodes 91 at the time of filling the ceramic electrodes 91 into the frames 93 and 100, and should be able to maximize flow of wastewater in the water path. In addition, the respective frames 93 and 110 should be an electrical insulator. Accordingly, the respective frames 93 and 110 are preferably formed by use of polycarbonate of high-strength, heat-resistant ABS resin, polypropylene, polyethylene, etc. The respective frames 93 and 110 may be selectively applied according to a service temperature condition, size and weight of the ceramic electrodes 91 of a bead shape, etc.

In addition, the electrode array assembly plate 200 can be fabricated by assembling and connecting a number of the electrode array electrification plates 100 according to a desired size. Further, a support (not shown) may be installed to keep an interval among the electrode array 90, the electrode array electrification plate 100 and the electrode array assembly plate 200.

Referring to FIG. 10, an electric power for electrolysis by the electrolytic device is supplied from an electric power source 80. The electric power source 80 may be designed to supply an alternating current (AC) single-phase 220V, an AC three phase 380V, and an AC three phase 440V.

The rectifier 86 that has received electricity from the in the electric power source 80 supplies a direct current (DC) voltage at the constant voltage mode. The DC voltage is supplied to keep a decomposition rate of wastewater constant, in which case electric current is applied according to a quantity of wastewater existing in the electrolyzer 30 both in the case that the water level rises up to a normal water level because wastewater flows in the electrolyzer 30 according to a start of a run and in the case that the water level becomes low according to an end of the run.

In addition, an electric current direction changer 87 which changes direction of electric current periodically to thereby detach foreign matters that are deposited on the polar plate of the electrode is further installed in the rectifier 86. At the time of electrolysis, cations, that is, positively charged (+) ions such as metallic ions and calcium ions are deposited on the cathode (−) plate, to thus cause a phenomenon of lowering an electrolysis efficiency. In order to prevent such an electrolysis efficiency from lowering, the electric current direction changer 87, which changes direction of electric current periodically, is provided in the rectifier 86. Accordingly, foreign matters that are deposited on the cathode plate of the electrode can be detached.

In addition, as shown in FIGS. 5 and 6, according to one arrangement of the electrode plates in the electrolytic device 50, the anode plate 51 and the cathode plate 53 are arranged in both ends of the electrolytic device 50, and the first electrification plate 52 and the second electrification plate 54 are arranged in the middle of the electrolytic device 50. Then, if a DC current is applied only to the anode plate 51 and cathode plate 53, negative charges are electrified on a surface corresponding to the second electrification plate 52b firstly adjoining to the anode plate 51 and positive charges are electrified on the other surface thereof. Then, negative charges are again electrified on a surface corresponding to the first electrification plate 52a firstly adjoining to the second electrification plate 52b, and positive charges are electrified on the other surface thereof. In this way, positive charges are electrified on a surface corresponding to the second electrification plate 52b lastly adjoining to the cathode plate 53.

Therefore, positive charges or negative charges are alternately electrified among the anode plate 51, the cathode plate 53, the first electrification plate 52a, and the second electrification plate 52b, which is called a bipolar electrode. Accordingly, wastewater that passes through the water path formed by the bipolar electrodes can be electrolyzed.

An electric current sensor 82 and a voltage sensor 83 are attached on the rectifier 86, in order to measure an output current and an output voltage, respectively. The measured output current and voltage are input to the controller 70, and displayed on an electric current display 84a and a voltage display 84b.

Of course, the electric current display 84a and the voltage display 84b can be directly connected to the electric power source 80 through a general electric current meter and a general voltage meter, to thus display an output current and an output voltage.

The washer 36 is installed on top of the electrolytic device in the electrolyzer 30, and is used to wash an anode plate 51, a cathode plate 53, and a number of electrodes 52a and 52b that constitute the electrolytic device 50. Further, the washer 36 is used to project a bubble removal agent in the case that an excessive number of bubbles occurs during electrolysis.

The washer 36 includes a number of nozzles 36b whose spray directions are set toward the electrolytic device 50, a distribution pipe 36a that supplies the number of nozzles 36b with cleaning water, and a second solenoid valve 68 which controls a cleaning water supply with respect to the distribution pipe 36a. The washer 36 is additionally connected with a third pump 63, which supplies high pressure water to the second solenoid valve 68 when cleaning water is not high pressure water (but is not an unnecessary component when the cleaning water is high pressure water).

The controller 70 is connected with the first to fifth water level sensors 41 to 45, the pH sensor 46, the first to third pumps 61 to 63, the electrical conductivity meter 65, the second solenoid controlled valve 68, the electric power source 80, the electric current sensor 82, the voltage sensor 83, the display 84, the driving map display 85, the buzzer 88, etc. Thus, the controller 70 transfers wastewater from the wastewater collection reservoir 10 to the wastewater storage retention reservoir 20 through input/output of respective signals supplied from the above-described components connected thereto, and controls an electrical conductivity and pH of wastewater in the wastewater storage retention reservoir 20 to then be transferred to the electrolyzer 30 and electrolyzed through the electrolytic device. Then, the wastewater is discharged after being electrolyzed.

The controller 70 further includes a manipulator 75 having an on/off switch which establishes whether to operate the system, an operation mode selective switch which makes the system operate automatically or manually, and an action switch which makes the system take a certain action.

When the operation mode selective switch chooses the automatic or manual operation, the system generally runs at an automatic mode and runs at a manual mode only when the system is at breakdown or during repair.

The display 84 is connected to the controller 70 and includes: the electric current display 84a and the voltage display 84b for displaying the electric current and voltage that are supplied from the electric power source to the electrolytic device and measured by the electric current sensor 82 and the voltage sensor 83, respectively; the pH display 84c for displaying the pH that is measured by the pH sensor 46; and a flow display 84d for displaying the flow state of wastewater that is sensed by the flow meter 24.

The driving map display 85 informs an operator of an action of each component which essentially operates for treatment of wastewater in operation of the electro-chemical water treatment apparatus according to the present invention. An operator can confirm whether or not the system runs under the normal condition through the driving map display 85. To confirm whether or not the system runs under the normal condition, the operational states of the respective components are displayed at appropriate positions around the wastewater storage retention reservoir 20 and the electrolyzer 30, and the operational states of the respective components are displayed using first to fifteenth lamps that function as described below. The first to fifteenth lamps are turned on and off by the controller 70.

The driving map display 85 includes: a first lamp indicating an operational condition of the first pump 61; second and third lamps indicating the upper limit value and the lower limit value of the second water level sensor 42, respectively; fourth and fifth lamps indicating the upper limit value and the lower limit value of the third water level sensor 43, respectively; sixth and eighth lamps indicating residual quantity of the electrolyte and the pH conditioner by the first level sensor 22a and the second level sensor 23a of the electrolyte tank 22 and the pH conditioner tank 23, respectively; seventh and ninth lamps indicating the opening and closing states of the electrical conductivity meter 65 and the pH meter 66, respectively; a tenth lamp indicating an operational condition of the second pump 62; an eleventh lamp indicating an overflow state of the electrolyzer 30 which is sensed by the fifth water level sensor 45; twelfth and thirteenth lamps indicating the upper limit value and the lower limit value of the fourth water level sensor 44, respectively; and fourteenth and fifteenth lamps indicating the opening and closing states of the first and second solenoid controlled valve 67 and 68, respectively.

Here, the driving map display 85 and the controller 70 can be implemented as a MMI (Man-Machine Interface) type. Accordingly, all functions of the driving map display 85 and the controller 70 of the MMI type can be replaced by a personal computer (PC).

The electro-chemical water treatment apparatus as constructed above according to the present invention operates as follows to remove total nitrogen (TN) and COD induction matters from wastewater.

It is confirmed whether an electrolyte and a pH conditioner are filled in the electrolyte tank 22 and the pH conditioner tank 23, respectively before activating the electro-chemical water treatment apparatus. Residual quantity of the electrolyte and the pH conditioner are identified by the first level sensor 22a and the second level sensor 23a which are installed in the electrolyte tank 22 and the pH conditioner tank 23, respectively. When the residual quantity of the electrolyte and the pH conditioner is smaller than a predetermined reference value, the controller 70 recognizes the shortage of the residual quantity of the electrolyte and the pH conditioner, to thereby make the buzzer 88 make an alarm and request the operator to fill the electrolyte and the pH conditioner in the electrolyte tank 22 and the pH conditioner tank 23.

If the electro-chemical water treatment apparatus is turned on by the on/off switch in the manipulator, at the state where the electrolyte tank 22 and the pH conditioner tank 23 have been prepared as mentioned above, the electric power is applied to the electro-chemical water treatment apparatus, so that respective data is displayed on the electric current display 84a, the voltage display 84b, the pH display 84c, and the flow display 84*d* in the display 84. In addition, the driving map display 85 indicates operation of the respective components.

If the operation mode selective switch of the manipulator 75 is selected at an automatic mode and then the operational switch is turned on at the state where the electro-chemical water treatment apparatus has been turned on by the on/off switch in the manipulator, the first pump 61 operates so that wastewater in the water collection reservoir 10 is supplied to the wastewater storage retention reservoir 20, and simultaneously the wastewater in the wastewater storage retention reservoir 20 is supplied to the electrolyzer 30 at a certain flux by the second pump 62. Accordingly, the wastewater starts to be electrolyzed by the electrolytic device 50 which has received the DC current from the rectifier 86.

Here, a quantity of the wastewater that is supplied from the wastewater storage retention reservoir 20 to the electrolyzer 30 is measured by the flow meter, and the measured flow is displayed on the flow display 84*d*. The flow control valve 25 is controlled to control flux if an overflow is sensed by the fifth water level sensor 45.

All the above-described actions are controlled by the controller 70. The controller 70 controls each component and causes the operational conditions to be indicated through the driving map display 85.

The detailed operations of the electro-chemical water treatment apparatus according to the present invention will follow.

Firstly, the controller 70 measures the water level in the wastewater storage retention reservoir 20 through the third water level sensor 43, and controls the first pump 61 to run and control the water level of the wastewater storage retention reservoir 20 at a certain level. The second water level sensor 42 makes the controller 70 control the buzzer 88 to make an alarm, when that the wastewater in the water collection reservoir 10 runs dry, and the wastewater inflow is interrupted by the wastewater storage retention reservoir 20, to thus make the water level lower than the lower limit value or when the wastewater does not move to the electrolyzer 30 due the foreign matters, to thus make the water level rise up and higher than the upper limit value.

In addition, if the water level in the wastewater storage retention reservoir 20 is lower than the lower limit value, the controller 70 is changed to a stop mode and discontinues running of the electro-chemical water treatment apparatus.

Wastewater is supplied to the electrolyzer 30, at a fixed flux by the second pump 62. If wastewater inflow starts by the second pump 62 and thus the water level rises up to a certain level or higher, the fourth water level sensor 44 detects the water level which has risen up to a certain level or higher, and controls the rectifier 86 to thus supply electric power to the electrolytic device 50.

The fifth water level sensor 45 senses an overflow phenomenon that happens when the outlet 27*a*, etc. is blocked so that the wastewater is not drained, or when the water level in electrolyzer 30 rises up due to an increase of an inflow of the wastewater from the wastewater storage retention reservoir 20. If an overflow is detected by the fifth water level sensor 45, the controller 70 controls the buzzer 88 to make an alarm.

After the wastewater treatment as described above has been completed, a process of stopping the running of the electro-chemical water treatment apparatus will follow.

A termination of the wastewater treatment under the normal condition is judged from a point in time that an inflow of wastewater to for the wastewater storage retention reservoir 20 is stopped, to then make the first pump 61, the electrical conductivity meter 65, the pH meter 66, etc., turned off.

When the water level in the wastewater storage retention reservoir 20 becomes lower than the low limit value of the second water level sensor, the second pump 62 is stopped, and the first solenoid controlled valve 67 is opened, so that remaining wastewater in the electrolyzer 30 starts to be discharged through the drain pipe 38. If the water level in the electrolyzer 30 is sensed by the fourth water level sensor 44 in the electrolyzer 30 and then becomes lower than the lower limit value, the electric power supply is interrupted for the electrolytic device 50, and simultaneously the second solenoid controlled valve 68 is opened. Accordingly, cleaning water is sprayed for the electrolytic device 50, through the nozzle 36*b* of the washer 36, to then clean the electrolytic device 50 for a given time.

Even during the cleaning process, the first solenoid controlled valve 67 is opened continuously. If a predetermined set time (which is a time set considering a cleaning time and a cleaning water discharge time) has passed, the first solenoid controlled valve 67 is closed to then completely stop the running of the electro-chemical water treatment apparatus.

In order to prevent an abnormal operation, the electro-chemical water treatment apparatus according to the present invention makes an alarm through the buzzer 88 or controls the entire system to stop under the following circumstances.

When an alarm is made, circumstances of relevant positions are displayed or indicated on the driving map display 85 or a PC screen. Accordingly, if circumstances of relevant positions are displayed or indicated on the driving map display 85 or a PC screen countermeasures, the electro-chemical water treatment apparatus is recovered into a normal running condition.

For example, abnormal circumstances which make an alarm are illustrated in Table 2.

TABLE 2

| Abnormal situation | Measures items |
| --- | --- |
| Exhaustion of pH conditioner solution | Supplement of pH conditioner solution after termination of system |
| Exhaustion of electrolyte solution | Supplement of electrolyte solution after termination of system |
| Overflow of storage retention reservoir | Relevant measures after termination of system |
| Overflow of electrolyzer | Relevant measures after termination of system |
| Abnormal temperature of electrolyzer | Relevant measures after termination of system |
| Open of cover of electrolyzer | Relevant measures after termination of system |
| Low/High of electric voltage and current | Relevant measures after termination of system |

In addition, when wastewater in the wastewater collection reservoir 10 runs dry, the electro-chemical water treatment apparatus is automatically stopped by the controller 70. However, if wastewater is refilled in the wastewater collection reservoir 10, the water level is sensed by the first water level sensor 41, and thus the electro-chemical water treatment apparatus is automatically reactivated.

Figure 11:
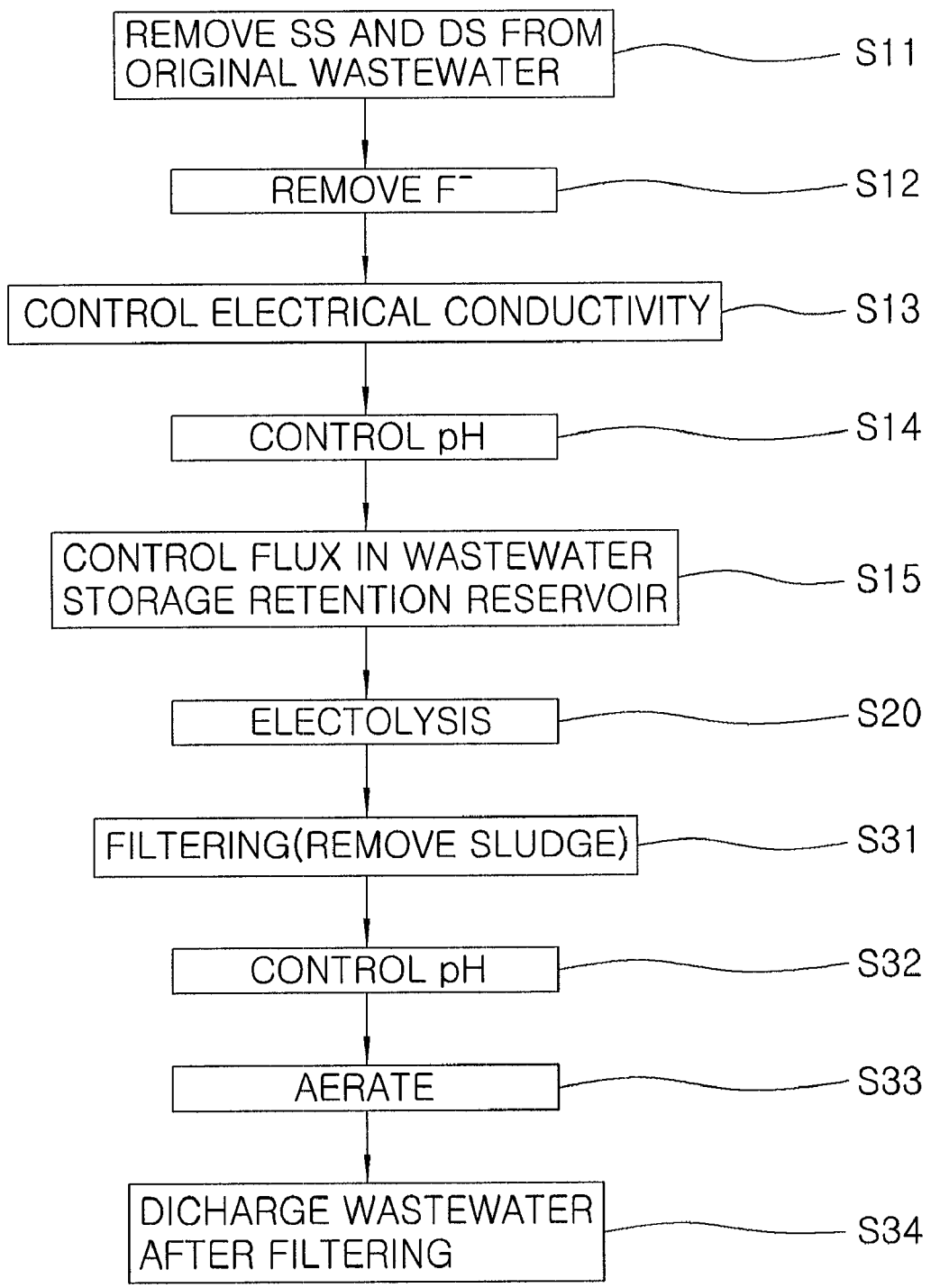
FIG. 11 is a flowchart view illustrating an electro-chemical water treatment method according to the present invention.

FIG. 11 is a flowchart view illustrating an electro-chemical water treatment method according to the present invention. Referring to FIG. 11, a pre-treatment process is executed to perform a physical treatment or chemical treatment of original wastewater contained or stored in the water collection reservoir in order to secure an efficient electrolysis process before performing an electrolysis.

Here, the pre-treatment process includes the step of removing suspended solid (SS) and dissolved solid (DS) included in the original wastewater (S11).

The physical treatment process is a process of entirely removing floating matters including SS (suspended solid), and is executed by a screening process, a filtering process that is a sand percolation process, and a gravitational precipitation process.

If scum that is produced by an electric flocculation during electrolysis is collected on the surface of water, the SS drops reactivity and the electrolytic device is polluted, which may result in a danger of explosion. Accordingly, the SS should be removed to perform a smooth electrolysis. The SS can be removed through the physical or chemical treatment process for this purpose.

The chemical treatment process includes a process (S12) of removing particulate matters, which cannot be removed by the physical treatment process and fluorine which is an electrolysis inhibitor, a process (S13) of controlling an electrical conductivity for electrolysis, and a pH control process (S14) such as an acid treatment process of projecting a pH conditioner to mitigate a molecular coupling force of non-degradable organic matters, in which a pH control, a dissolution of floating matters, and a molecular coupling force of non-degradable organic matters and composite structural matters can be mitigated using hydrochloric acid, sulfuric acid, etc.

The chemical treatment process also includes an alkali treatment step of removing heavy metals which may bring about an electrification at the time of a pH control, coherence and electrolysis, using caustic soda, a chemical sedimentation step of precipitating heavy metals or other hardness (alkalinity) inducers using alum, iron salt etc., an electric flocculation and membrane filtration step of selectively removing minute colloidal particles, and a chemical processing step using NaCl, NaOCl, $Ca(ClO)_2$, $Ca(OH)_2$ etc.

In more detail, at the chemical processing step, pH and electrical conductivity are controlled, an inhibition material such as fluorine $F^-$ or other anions are precipitated, and a decomposition rate of decomposing organic matters is increased. When components and states of wastewater are pure, and thus a special precipitation pre-treatment is not necessary at the process of treatment of nitrogen-contained wastewater, a chemical of NaOCl may be used. When sediment is expected to occur and thus a flocculation treatment should be accompanied in advance, a chemical of $Ca(ClO)_2$ may be used, to thereby supplement performance of the entire electro-chemical water treatment apparatus. In this case, it is preferable to use a polymer of a polymer coagulant series in a weak anion group. An enrichment facility, a sludge storage retention facility and a dehydrator are accompanied incidentally at the step of controlling pH (S14).

Further, $Ca(ClO)_2$ may bring an effect that can treat fluorine, and when nitrogen is contained in wastewater unlike existent slaked lime or calcium oxide, a sludge floating effect can be suppressed, to thereby provide a remarkable effect of reducing a scale of a sediment facility and making an electrolytic device compact.

NaOCl and $Ca(ClO)_2$ supply $Cl^-$ or $OCl^-$ ions and thus play a role of an oxidizing agent and control a hydrogen ion concentration (pH) as well as improve an electrical conductivity. In addition, an electric power load can be reduced at electrolysis. As well, organic materials such as fluorine and phosphorus can be decomposed. Here, in the case that NaOCl and $Ca(ClO)_2$ are used, it is necessary to control capacity of the electrolyzer, the kind of the electrodes, a current density, a processing capacity, etc.

In addition, at the pre-treatment process, phosphorus (P) can be removed by using iron salt (first iron salt and second iron salt), alum, etc. Otherwise, in the case of removing phosphorus (P) by employing an electrolysis, an eruption electrode (such as an iron electrode and an aluminum series electrode) is used to remove phosphorus (P). In this case, it is necessary to specially design the electrolyzer and the sediment sludge discharging method. A facility for filtering and precipitating wastewater should be considered before the wastewater flows in the electrolyzer.

An agitator, an aeration device, etc., can be accompanied separately for smooth agitation at the time of projecting a chemical. Specifically, in the case of the aeration device, an incidental effect such as improvement of an efficiency can be brought in association with the oxidizing agent. However, since an excessive aeration can promote creation of nitrite nitrogen at the time of processing nitrogen series, a stepwise air quantity adjuster is attached to the electro-chemical water treatment apparatus, to thereby suppress an unnecessary side-reaction.

In addition, the pre-treatment process may further include a process of projecting a bubble removal agent in the wastewater.

Then, the wastewater that has passed through the pre-treatment process undergoes an equality of the wastewater quality and quantity and a control of flux of the wastewater which flows in the electrolytic device through an equality water tank, which is called a wastewater storage retention reservoir (S15).

The wastewater that has passed through the above-described processes, is electrolyzed by an electrolytic device, which includes an anode plate and a cathode plate through which an anode direct current and a cathode direct current flow, respectively, when an electricity is applied to the anode plate and the cathode plate, and a number of electrodes which are arranged as an electrification body between the anode plate and the cathode plate, respectively (S20).

The electrolytic device employs an electrolytic device that is illustrated to FIGS. 2 to 9.

After having passed through the electrolysis process, a post-treatment process of wastewater for controlling by-products and components and states of the wastewater that are inevitably produced at the electrolysis reaction process is undergone.

The post-treatment process includes a filtration process S31 to remove sludge, a process S32 that controls pH, an aeration process S33 of supplying air, and a process S34 of removing additional remaining smell or chlorine.

First, the filtration process is a process of removing sludge. The filtration process is executed when dissolved solid substances that are not removed in the pre-treatment process are exhausted together with discharged wastewater via an incidental electric flocculation process. When a gravitational pre-cipitation process may be executed in view of the quantity and components and states of sludge, a precipitation chamber is provided to remove sludge. On the contrary, when such a gravitational precipitation of the kind of the produced sludge is impossible, heavy metals and alien substances are removed and a deodorization effect is obtained using a filter of a kind of activated carbon such as zeolite, functional charcoal, and sand.

Then, in the case of the wastewater having undergone the electrolysis treatment, a pH behavior may occur over time considering components and states of the wastewater and a dissolution reaction time. In this case, a special aeration device and a special storage retention and control space for pH control and recovery, are needed. Additionally, a small quantity of a pH conditioner is projected into the wastewater.

Wastewater of high concentration requires a reaction time of long hours, in view of the features of the high concentration wastewater. Here, a temperature rise of wastewater to be treated, an excessive pH change and OCl⁻ ions may occur inevitably. In this case, a certain amount of original wastewater is mixed with the wastewater to be treated within an allowable range of the wastewater to be discharged. Accordingly, the above-described side effects may be solved, and several effects such as OCl⁻ concentration reduction, temperature drop, and pH control can be obtained.

In addition, in the case of wastewater to be treated when variation of wastewater concentration occurs, change of treatment concentration may occur according to modification of original wastewater concentration. In order to maintain treatment quality of water of low concentration, a running water reservoir and a flux control reservoir are provided to maintain concentration, pH and temperature of treated wastewater and concentration of other ingredients.

When occurrence of nimious vapors and other gases according to the treatment process is expected in the case of the post-treatment facility, these vapors and gases can be considered separately. In this case, captured vapors and gases can be processed through a wet or dry scrubber, or can be re-captured in wastewater and recycled as incidental ingredients.

Here, it is desirable to control and discharge wastewater after having executed the post-treatment process at a temperature not more than 40° C., which is a wastewater dischargeable reference value.

An efficient electro-chemical water treatment method according to components and states of wastewater is described below.

Each electro-chemical water treatment method processes wastewater according to components and states of the wastewater, which is produced in a semiconductor manufacturing process, a chemicals manufacturing process and an atomic power generation process.

First, characteristics of wastewater that is produced by a semiconductor manufacturing process appear in Table 3. Since wastewater is produced while manufacturing semiconductor devices, suspended solid (SS) ingredients hardly exist. As a result, a special SS removal pre-treatment process is not needed. However, an electrolysis load may be reduced, part of ammonia nitrogen may be removed, and an electrical conductivity may be heightened. As well, the pre-treatment process is performed by using $Ca(ClO)_2$ in order to remove fluorine that may cause damage of electrodes.

Here, instead of using the $Ca(ClO)_2$, NaOCl may be used to thereby expect an equal effect. However, the case of using NaOCl requires more maintenance cost than the case of using $Ca(ClO)_2$.

Meanwhile, $Ca(ClO)_2$ of one equivalent is added to fluorine of two equivalents in order to remove fluorine. Fluorine is precipitated in a $CaF_2$ form. A precipitation time and a precipitation rate can be improved by using polymer coagulant (negative ion series or weak negative ion series) considering an economic efficiency.

In addition, when an electrical conductivity needed for electrolysis is not secured only with $Ca(ClO)_2$, NaCl can be used in parallel with $Ca(ClO)_2$. When the pre-treatment is introduced as described above, an equal decomposition rate can be obtained even if the electro-chemical water treatment apparatus is run at a current density less than an existing value in comparison with the case that the pre-treatment is not introduced.

TABLE 3

Components and influences of wastewater after having processed semiconductor

| Chromaticity | Transparency | |
|---|---|---|
| SS(suspended solid) | Almost non-existence | |
| F⁻ | 50~100 ppm | |
| Ammonia nitrogen (NH₃—N) | 500~900 ppm | Material to be removed |
| Electrical conductivity | 1 mS/cm or below | |
| pH | neutral | |
| Cl⁻ concentration | Almost non-existence | |
| Surface active agent | Almost non-existence | |

Components and states of wastewater that is produced in a semiconductor manufacturing process are illustrated in Table 3. As described above, the electro-chemical water treatment method of wastewater, includes the steps of storing and retaining the wastewater in a wastewater collection reservoir and a wastewater storage and retention reservoir, respectively, and then performing a chemical pre-treatment process.

In the chemical pre-treatment process, fluorine is removed by projecting $Ca(OCl)_2$, in which case a fluorine concentration decreases to 15 ppm or below from 100 ppm, after having projected $Ca(OCl)_2$. Further, by projecting $Ca(OCl)_2$, pH is incidentally increased, an electrical conductivity is secured, and an effect of additionally oxidizing organic matters and removing ammonia can be obtained.

According to a treatment condition of the chemical pre-treatment process, $Ca(OCl)_2$ (12%, W/W) of 20-40 mL is projected into wastewater on the basis of an ammonia concentration of 500 ppm, and then a pH rise (optimum pH: 10-11) and an electrical conductivity (15-20 mS/cm) are checked. According to the result of checking the pH rise and the electrical conductivity, an appropriate amount of $Ca(OCl)_2$ is projected into the wastewater, and then the wastewater, which is located at the upper portion of the wastewater, is discharged into the wastewater storage retention reservoir which plays a role of controlling a flux of wastewater, after having undergone a precipitation of about 1-3 hours.

In addition, when an electrical conductivity is lower than a certain level after having performed the chemical pre-treatment process, NaCl is used in parallel with $Ca(OCl)_2$ to thus correct the electrical conductivity.

If the wastewater which is located at the upper portion of the wastewater is muddy due to $Ca^{2+}$ ingredients, polymer (negative ion series or weak negative ion series) may be used for improvement of the quality of water. Here, a polymer solution of 0.1% (W/W) is made and the polymer solution is projected into the wastewater at a ratio of 1-2 ml/L as a projection quantity of the polymer solution. The polymer solution which is excessively projected into the wastewater, has an adverse influence upon an electrolysis efficiency. In this case, polymer ingredient cohesion of moires may be formed on the electrode surface.

The wastewater having passed through the above-described processes undergoes an electrolysis process. Because NaOCl and $Ca(ClO)_2$ have been used during the pre-treatment process, the electro-chemical water treatment apparatus can be run at the low-current in comparison with 70 mA/cm² of the case of having not passed through the pre-treatment process, considering an incidental oxidation effect.

The remaining ammonia nitrogen can be removed at a current density of about 35-50 mA/cm² from the wastewater, which has been discharged after having performed the chemical pre-treatment process. In order to control a smell of the treated wastewater, it is preferable that pH be maintained at about pH 9 or higher at the electrolysis process. Here, pH is controlled to be a little high.

On the following, the electro-chemical water treatment method for treatment of wastewater containing non-degradable materials will be described.

Table 4 illustrates general components and states of wastewater containing non-degradable materials. The non-degradable materials are combined in a benzene ring compound form. Thus, the non-degradable materials are strongly toxic. Accordingly, the non-degradable materials can be hardly processed by a biological treatment process. In addition, the non-degradable materials have a strong coherence. Accordingly, it is difficult to decompose the non-degradable materials.

TABLE 4

Components and influences of wastewater containing non-degradable materials

| | | |
|---|---|---|
| SS(suspended solid) | Almost non-existence | |
| Chromaticity | Diversity | Material to be removed |
| Electrical conductivity | 10~30 mS/cm | |
| pH | 3~10 | |
| Cl⁻ concentration | Almost non-existence | |
| Surface active agent | Almost non-existence | |
| Non-degradable Benzene ring compound(Benzene, Toluene, xylene 1,4-Dioxin, MNT, DNT, Phenol, others) | 50~1,000 ppm | Material to be removed |
| TN | 100~1,500 ppm | Material to be removed |
| $COD_{Mn}$ | 10,000 ppm or more | Material to be removed |

In the case of the electro-chemical water treatment method for treatment of wastewater, which has been exhausted through the above-described chemical compound manufacturing process, original wastewater is stored and retained in the wastewater collection reservoir and the wastewater storage retention reservoir, respectively.

Then, the chemical pre-treatment process is undergone. For processing non-degradable substances in wastewater, HCl is projected into the wastewater. As a result, Cl⁻ that is necessary for electrolysis is supplied in the wastewater and thus pH becomes low to be 2-3. Here, if pH becomes low, the substances that exist in the wastewater are precipitated while forming sludge. Then, the precipitated matters are removed, and only the wastewater which is located at the upper portion of the wastewater is electrolyzed.

When there is chromaticity in the wastewater, chromaticity of the wastewater, which is located at the upper portion of the wastewater, is improved due to the precipitation.

In addition, non-degradable substances included in the wastewater may be converted to biodegradable substances using NaOCl. In parallel with NaOCl, $Ca(ClO)_2$ can be used. However, since $Ca^{2+}$ ingredients are representative materials that can reduce the lifetime of an electrode when they are deposited in the electrode, a special facility and a treatment process are necessary to prevent this.

The pre-treatment process for wastewater, which has been exhausted through the above-described chemical compound manufacturing process, should secure a removal of dissolved materials through precipitation and a removal of chromaticity depending upon sludge produced by projection of HCl, and a pH control and an electrical conductivity for enhancing an electrolysis efficiency.

The treatment condition of the chemical pre-treatment process will be described below. HCl of 36% is projected into original wastewater. The pH of the original wastewater becomes 2-3.

Then, an electrical conductivity and a chromaticity of the wastewater are checked. According to the result of checking the electrical conductivity and the chromaticity of the wastewater, an appropriate amount of HCl is projected into the wastewater, and then the wastewater which is located at the upper portion of the wastewater is discharged into the wastewater storage retention reservoir which plays a role of controlling a flux of wastewater, after having undergone a precipitation of about 3-5 hours.

The wastewater, whose flux is adjusted through the wastewater storage retention reservoir, passes through an electrolysis process. Before passing through the electrolysis process, floating matters such as suspended solids which are not precipitated but floated in the wastewater are removed by a filter through which the wastewater passes. In addition, in the case of the poor electrical conductivity, NaCl is projected in the wastewater to thus correct the electrical conductivity.

The wastewater supplied through the wastewater storage retention reservoir passes through the electrolysis process. HCl is used to incidentally accompany an oxidation effect and an effect of precipitating dissolved floating matters. Further, HOCl whose oxidizing power is stronger than OCl⁻ that is produced at the electrolysis reaction is produced under the low pH, to thereby bring an increase in an oxidizing power.

Non-degradable matters are removed from the wastewater after the chemical pre-treatment process at a current density of about 40-80 $mA/cm^2$.

In addition, in the case of the wastewater having passed through the electrolysis process, suspended solids (SS) are floated by an electricity flocculation effect, to thereby form scum. As a result, it is necessary to provide a reactor for removing additional scum and smooth discharge of the scum.

The wastewater that has passed through the electrolysis process passes through a post-treatment process. A biologic treatment process is performed by a post-treatment process as toxicant is removed. Here, a problem does not happen when wastewater having passed through an electrolysis process flows in the post-treatment process, but a combination of suitable post-treatment processes is needed when wastewater is discharged as the final discharge water, considering aesthetic estimation factors.

The post-treatment process includes, a process that controls pH, an aeration process of supplying air, and a process of removing additional remaining smell or chlorine, due to a contact media processing using sand, activated carbon, functional charcoal, and zeolite, in which case temperature of the discharged wastewater is controlled at 40° C.

In the electro-chemical water treatment method of wastewater that is exhausted from an electric power plant, support electrolyte is first projected before having performed an electrolysis in view of features of the wastewater to thereby undergo a process of controlling an electrical conductivity and to then projecting a pH conditioner to control pH.

The flux of the wastewater having passed through the above-described processes is controlled in the wastewater storage retention reservoir and then electrolyzed, and the wastewater having passed through the electrolysis process passes through a filtration process for removing sludge, an aeration process, and a post-treatment process for filtering remaining smell and chlorine, and then discharged.

[Mode for Invention]

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

[Industrial Applicability]

As described above, the present invention is applied to an electro-chemical water treatment apparatus using a titanium electrode, a ceramic electrode or an electrode array in order to remove total nitrogen (TN) ingredients of ammonia nitrogen, nitrous acid nitrogen, nitrate nitrogen etc., organic matters of BOD (Biological Oxygen Demand) and COD (Chemical Oxygen Demand) induction ingredients, and cyanogen included in wastewater and dirty water.

The invention claimed is:

1. An electro-chemical water treatment apparatus comprising: a wastewater collection reservoir that contains wastewater; a wastewater storage retention reservoir that controls a hydrogen ion concentration (pH), an electrical conductivity and an amount of flow of wastewater that is supplied from the wastewater collection reservoir;
   an electrolyte tank which supplies the wastewater with an electrolyte for making the electrical conductivity of the wastewater in the wastewater storage retention reservoir at an electrical conductivity at which an electrolysis can be achieved;
   a hydrogen ion concentration (pH) conditioner tank that supplies a hydrogen ion concentration (pH) conditioner for the wastewater in the wastewater storage retention reservoir;
   at least one selected from an electricity flocculation device, a precipitation device, and a filtering device in order to remove solid matters that exist in the wastewater before the wastewater flows into an electrolyzer;
   an electrolyzer including an anode plate and a cathode plate through which an anode direct current and a cathode direct current flow, respectively, and a number of electrodes which are arranged as an electrification body between the anode plate and the cathode plate, respectively, and which electrolyses the wastewater supplied from the wastewater storage retention reservoir; wherein the electrodes in the electrolyzer are formed of ceramic electrodes, and the shape of the respective electrodes is formed of one selected from a bead shape, a cylindrical shape, an oval shape, a tetrapod shape, a hexahedron shape and the wastewater passes through a gap that is formed between the number of the ceramic electrodes, wherein each of the ceramic electrodes comprises: a ceramic base material; and a coating layer which is formed of an Ir compound, a Ru compound, and a Sn compound as main ingredients, respectively, on the surface of the ceramic base material, and which is formed of a compound including at least one selected from a Ti compound, a Mo compound, a Ta compound and a Zr compound, in addition to the main ingredients;
   a frame in which the number of ceramic electrodes are filled in a mono layer;
   wherein fitting protrusions which are outwardly protruded and fitting grooves which correspond to the fitting protrusions are formed on the outer side the frame, so that the frame is coupled with neighboring another frame, and a number of the electrode arrays are coupled through the fitting protrusions and the fitting grooves; and
   a controller which grasps state of wastewater, controls level of the wastewater collection reservoir, controls the hydrogen ion concentration (pH), the electrical conductivity and the amount of flow of wastewater in the wastewater storage retention reservoir, and controls level of the electrolyzer and which is connected to the anode plate and the cathode plate to thereby control the electrolysis.

2. The electro-chemical water treatment apparatus according to claim 1, wherein the number of the electrodes in the electrolyzer comprise:
   a number of ceramic electrodes of a bead shape, respectively; and
   an electrode array which is combined with the frame and includes a fixing mesh to fix the number of the ceramic electrodes so that the number of the ceramic electrodes does not fall down.

3. The electro-chemical water treatment apparatus according to claim 2, wherein the frame and the fixing mesh are formed of any one selected from polycarbonate, polyethylene, polypropylene and ABS (Acrylonitrile Butadiene Styrene) resin.

4. The electro-chemical water treatment apparatus according to claim 1, wherein each element compound of the coating layer is a chloride compound containing chlorine bonded with the respective compound.

5. The electro-chemical water treatment apparatus according to claim 1, wherein thickness of the coating layer is 3-10 µm.

6. The electro-chemical water treatment apparatus according to claim 1, further comprising an electric current direction changer which changes direction of the electric current periodically, to thereby detach foreign matters that are deposited on the cathode plate.

7. The electro-chemical water treatment apparatus according to claim 1, wherein at least one selected from NaCl, NaOCl, $Ca(OH)_2$ and $Ca(ClO)_2$ is projected into the wastewater storage retention reservoir in order to control an electrical conductivity of wastewater and to treat fluorine.

8. The electro-chemical water treatment apparatus according to claim 1, further comprising a rectifier which can control an on/off operation of the electro-chemical water treatment apparatus by a low/high value which is set in correspondence to the supplied voltage and electric current in order to secure stability of the electro-chemical water treatment apparatus.

9. An electro-chemical water treatment method comprising:
   (a) a pre-treatment process of performing a physical treatment by projecting coagulant and polymer into original wastewater to facilitate an electrolysis, to thereby remove suspended solid (SS) and dissolved solid (DS) included in the original wastewater, and a chemical treatment by projecting NaCl and NaOCl into original wastewater to facilitate an electrolysis, to thus control an electrical conductivity and remove non-degradable organic matters included in the original wastewater;
   (b) a process of controlling an electrical conductivity of the wastewater that has undergone the pre-treatment process (a);
   (c) a process of projecting a hydrogen ion concentration (pH) conditioner into the wastewater that has undergone the electrical conductivity control process (b) to thus control a hydrogen ion concentration (pH);
   (d) a process of removing solid matters in the wastewater that has undergone the hydrogen ion concentration (pH) conditioner projecting process (c) by at least one selected from an electricity flocculation device, a precipitation device, and a filtering device;

(e) a process of electrolyzing the wastewater having undergone the hydrogen ion concentration (pH) conditioner projecting process (d) by an electrolytic device which includes an anode plate and a cathode plate through which an anode direct current and a cathode direct current flow, respectively, and a number of electrodes which are arranged as an electrification body between the anode plate and the cathode plate, respectively, wherein the electrodes in the electrolyzer are formed of ceramic electrodes, and the shape of the respective electrodes is formed of one selected from a bead shape, a cylindrical shape, an oval shape, a tetrapod shape, a hexahedron shape and the wastewater passes through a gap that is formed between the number of the ceramic electrodes, wherein each of the ceramic electrodes comprises:

a ceramic base material; and a coating layer which is formed of an Ir compound, a Ru compound, and a Sn compound as main ingredients, respectively, on the surface of the ceramic base material, and which is formed of a compound including at least one selected from a Ti compound, a Mo compound, a Ta compound, and a Zr compound, in addition to the main ingredients; and (f) a post-treatment process of performing a post-treatment which comprises a process of filtering the wastewater to remove sludge, a process of controlling a hydrogen ion concentration (pH), an aerating process of supplying air, and a filtering process of removing additional remaining odor and chlorine, before discharging the wastewater that has undergone the wastewater electrolysis process (e).

10. The electro-chemical water treatment method of 9, wherein the number of the electrodes comprises:

a number of ceramic electrodes of a bead shape, respectively;

a frame in which the number of the ceramic electrodes are filled in a mono layer type; and an electrode array which is combined with the frame and includes a fixing mesh to fix the number of the ceramic electrodes so that the number of the ceramic electrodes does not fall down.

* * * * *